United States Patent
Hosoya

(10) Patent No.: US 9,679,407 B2
(45) Date of Patent: Jun. 13, 2017

(54) ELECTRONIC DEVICE, STORAGE MEDIUM, PROGRAM, AND DISPLAYING METHOD

(71) Applicant: SEMICONDUCTOR ENERGY LABORATORY CO., LTD., Atsugi-shi, Kanagawa-ken (JP)

(72) Inventor: Kunio Hosoya, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 260 days.

(21) Appl. No.: 13/875,400

(22) Filed: May 2, 2013

(65) Prior Publication Data
US 2013/0300732 A1 Nov. 14, 2013

(30) Foreign Application Priority Data
May 11, 2012 (JP) ................................ 2012-109132

(51) Int. Cl.
G06T 15/00 (2011.01)
G06F 1/16 (2006.01)
(Continued)

(52) U.S. Cl.
CPC .......... *G06T 15/005* (2013.01); *G06F 1/1652* (2013.01); *G06F 1/1694* (2013.01);
(Continued)

(58) Field of Classification Search
None
See application file for complete search history.

(56) References Cited

U.S. PATENT DOCUMENTS 6,375,572 B1  4/2002  Masuyama et al.
6,641,482 B2  11/2003  Masuyama et al.
(Continued)

FOREIGN PATENT DOCUMENTS

CN   101782804   7/2010
EP   1895774 A   3/2008
(Continued)

OTHER PUBLICATIONS

International Search Report (Application No. PCT/JP2013/062792; PCT17043) Dated Jul. 9, 2013.
(Continued)

*Primary Examiner* — Jwalant Amin
(74) *Attorney, Agent, or Firm* — Jeffrey L. Costellia; Nixon Peabody LLP

(57) ABSTRACT

An electronic device is provided which displays an object (body) on a flexible display screen in accordance with a three-dimensional shape of the display screen by utilizing the flexibility of the display screen. An electronic device including a display portion which includes a flexible display device displaying an object on a display screen; a detection portion detecting positional data of a given part of the display screen; and an arithmetic portion calculating a three-dimensional shape of the display screen on the basis of the positional data and computing motion of the object to make the object move according to a given law in accordance with the calculated three-dimensional shape of the display screen.

15 Claims, 20 Drawing Sheets

(51) Int. Cl.
  *G06T 13/20* (2011.01)
  *G06F 3/01* (2006.01)
  *H04M 1/02* (2006.01)

(52) U.S. Cl.
  CPC .............. *G06F 3/011* (2013.01); *G06T 13/20* (2013.01); *G06F 2200/1637* (2013.01); *G06F 2203/04102* (2013.01); *G09G 2380/02* (2013.01); *H04M 1/0268* (2013.01)

(56) References Cited

U.S. PATENT DOCUMENTS

| | | |
|---|---|---|
| 7,223,173 B2 | 5/2007 | Masuyama et al. |
| 7,601,066 B1 | 10/2009 | Masuyama et al. |
| 8,015,490 B2 | 9/2011 | Ogikubo |
| 8,666,455 B2 | 3/2014 | Song |
| 9,323,378 B2 | 4/2016 | Choe |
| 2004/0029640 A1 | 2/2004 | Masuyama et al. |
| 2006/0062983 A1* | 3/2006 | Irvin et al. ............... 428/220 |
| 2007/0178974 A1 | 8/2007 | Masuyama et al. |
| 2007/0247422 A1* | 10/2007 | Vertegaal ........... G06F 3/017 345/156 |
| 2009/0002328 A1* | 1/2009 | Ullrich et al. ............... 345/173 |
| 2009/0036213 A1 | 2/2009 | Masuyama et al. |
| 2009/0219247 A1 | 9/2009 | Watanabe et al. |
| 2009/0325698 A1 | 12/2009 | Masuyama et al. |
| 2010/0164888 A1 | 7/2010 | Okumura et al. |
| 2011/0134144 A1 | 6/2011 | Moriwaki |
| 2011/0227822 A1* | 9/2011 | Shai ........................... 345/156 |
| 2011/0312419 A1 | 12/2011 | Masuyama et al. |
| 2012/0004032 A1 | 1/2012 | Masuyama et al. |
| 2013/0321373 A1 | 12/2013 | Yoshizumi |
| 2014/0173471 A1* | 6/2014 | Maenpaa ............. G06F 1/1637 715/763 |

FOREIGN PATENT DOCUMENTS

| | | |
|---|---|---|
| EP | 2 202 624 A2 | 6/2010 |
| EP | 2287710 A | 2/2011 |
| JP | 2001-170358 | 6/2001 |
| JP | 2004-046792 | 2/2004 |
| JP | 2006-330082 | 12/2006 |
| JP | 2007-048237 A | 2/2007 |
| JP | 2009-205565 | 9/2009 |
| JP | 2010-157060 | 7/2010 |
| JP | 2010-211211 A | 9/2010 |
| JP | 2011-044128 A | 3/2011 |
| TW | 200745986 | 12/2007 |

OTHER PUBLICATIONS

Written Opinion of the International Searching Authority (Application No. PCT/JP2013/062792; PCT17043) Dated Jul. 9, 2013.

* cited by examiner

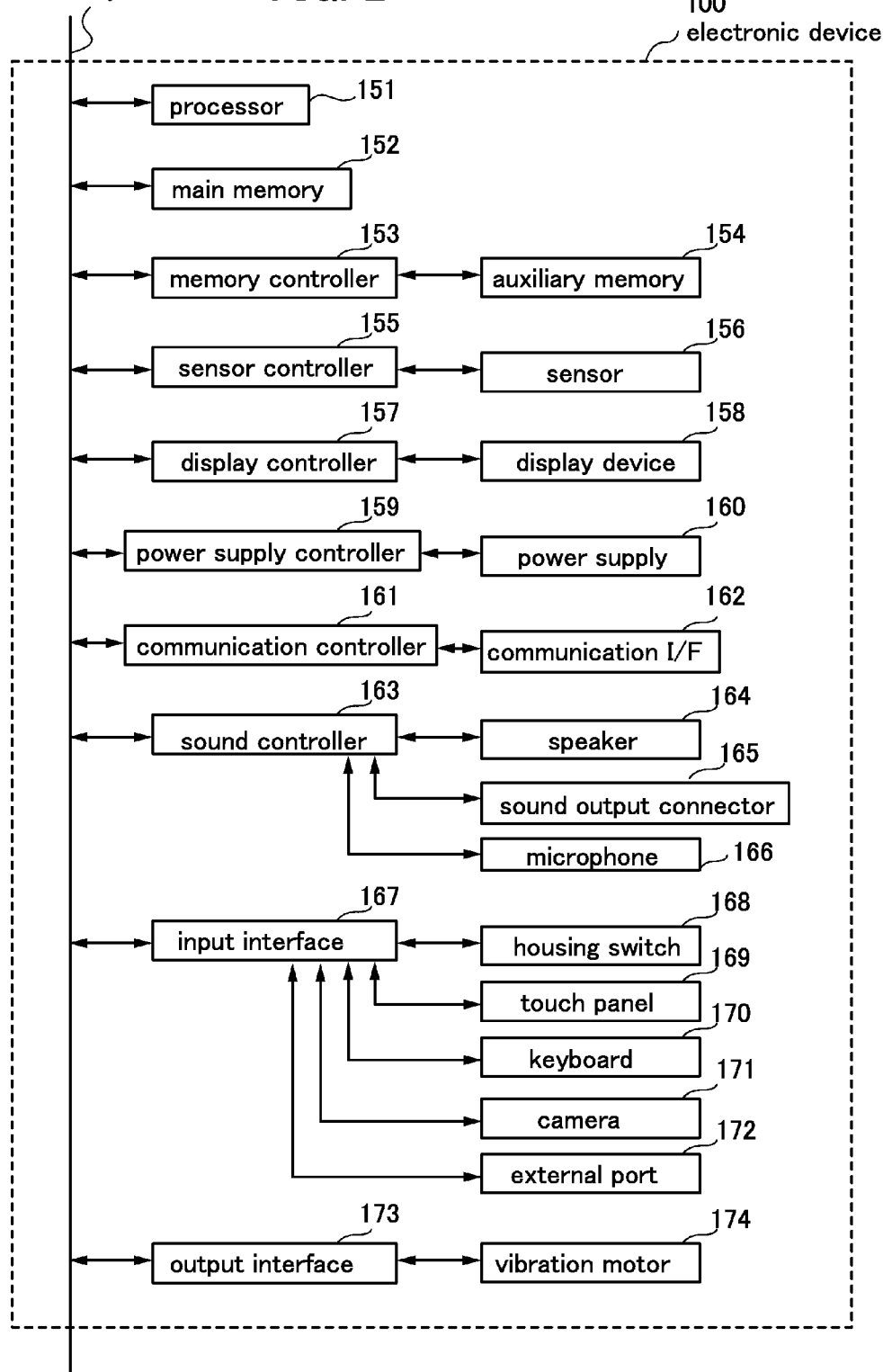

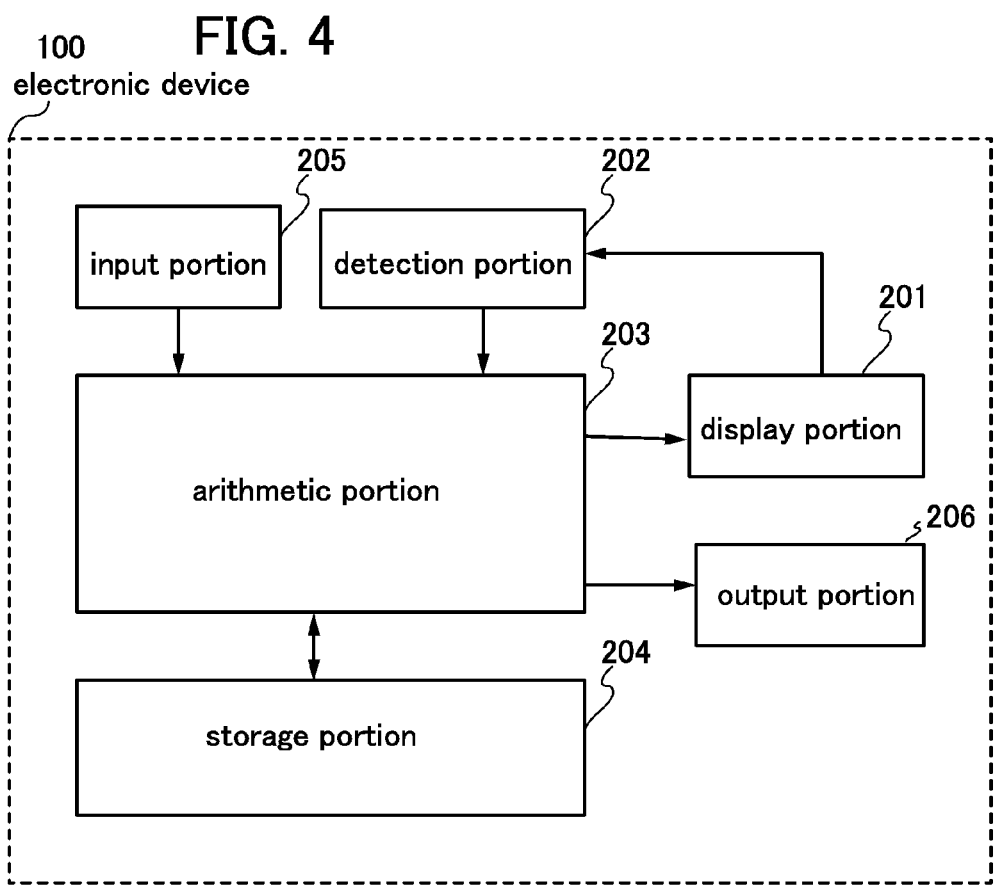

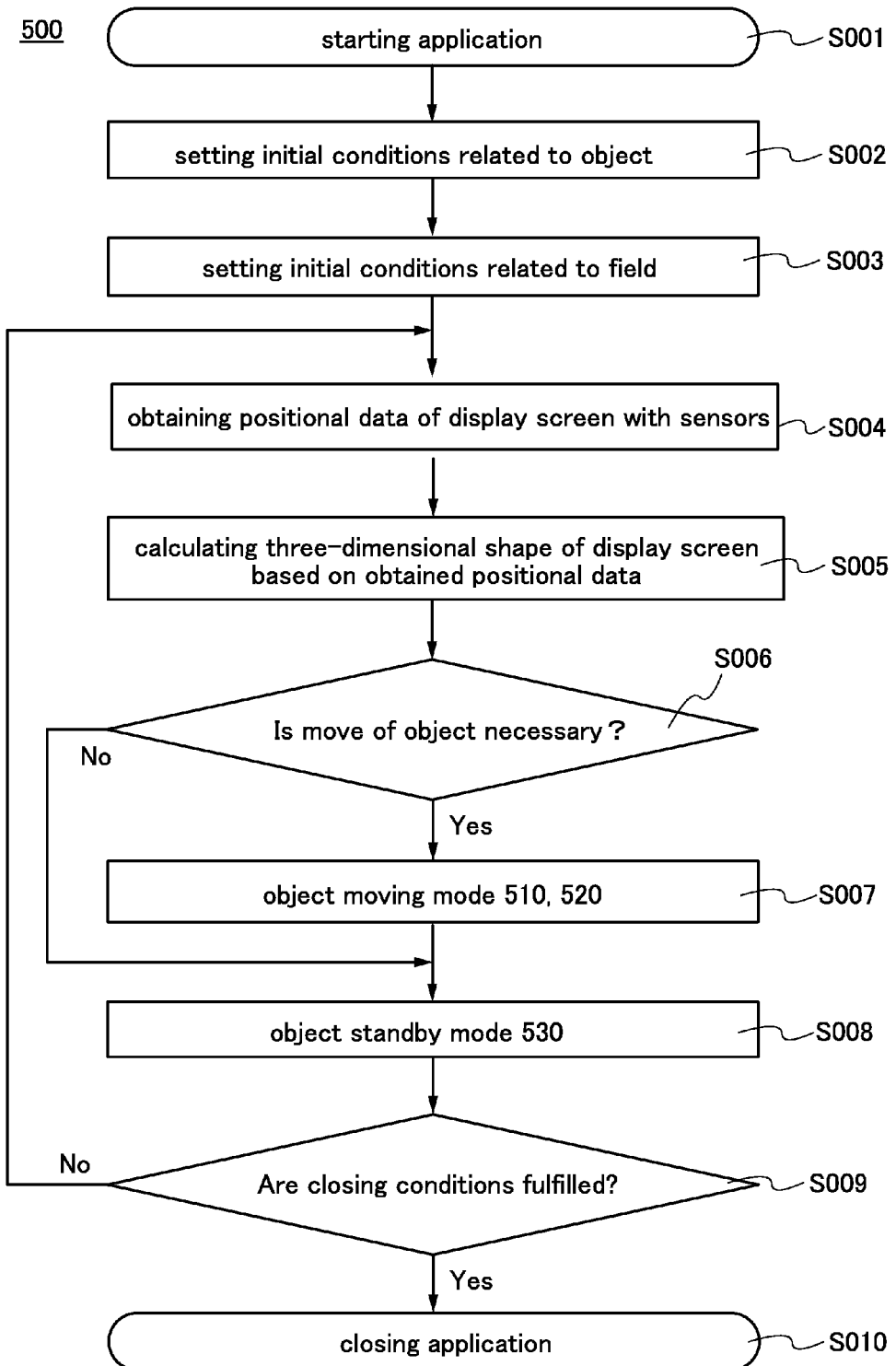

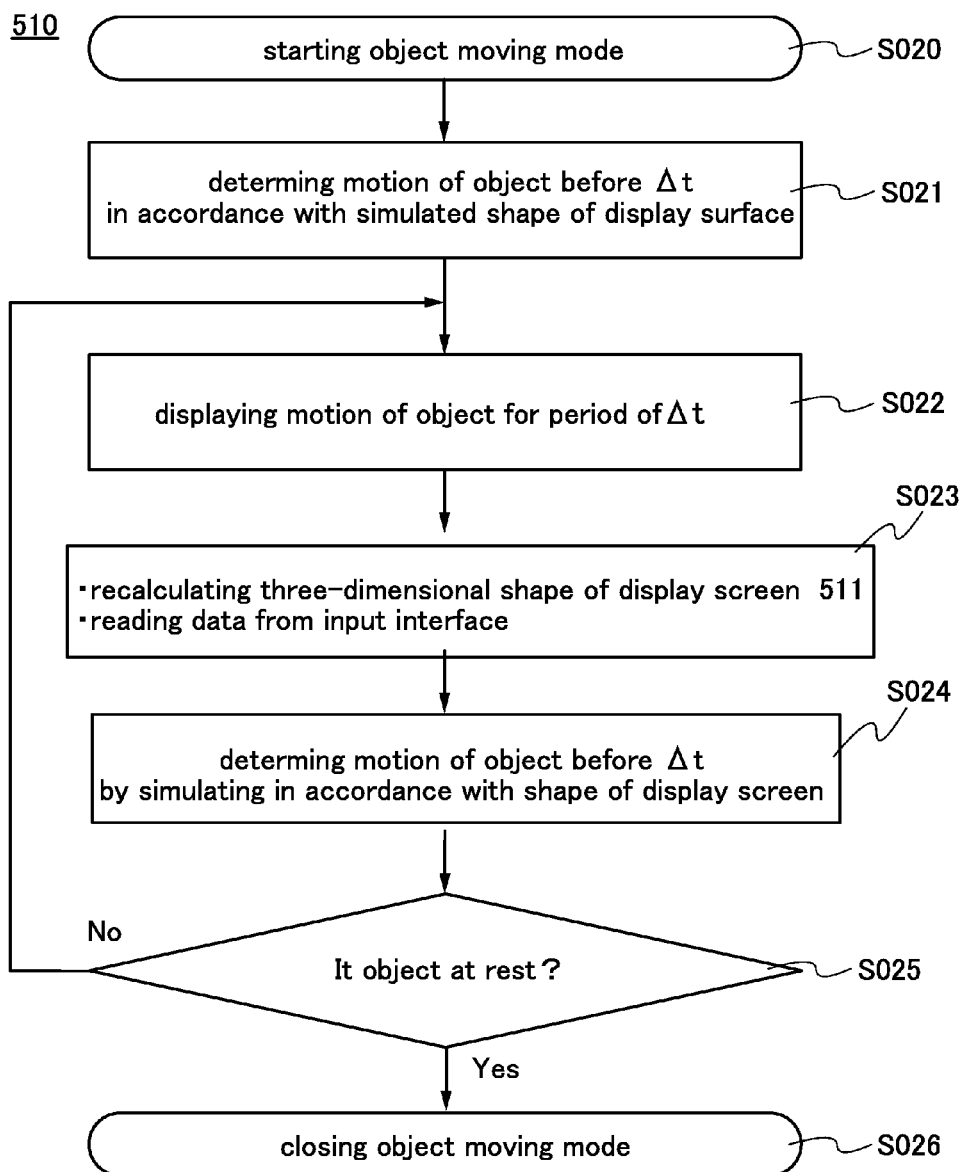

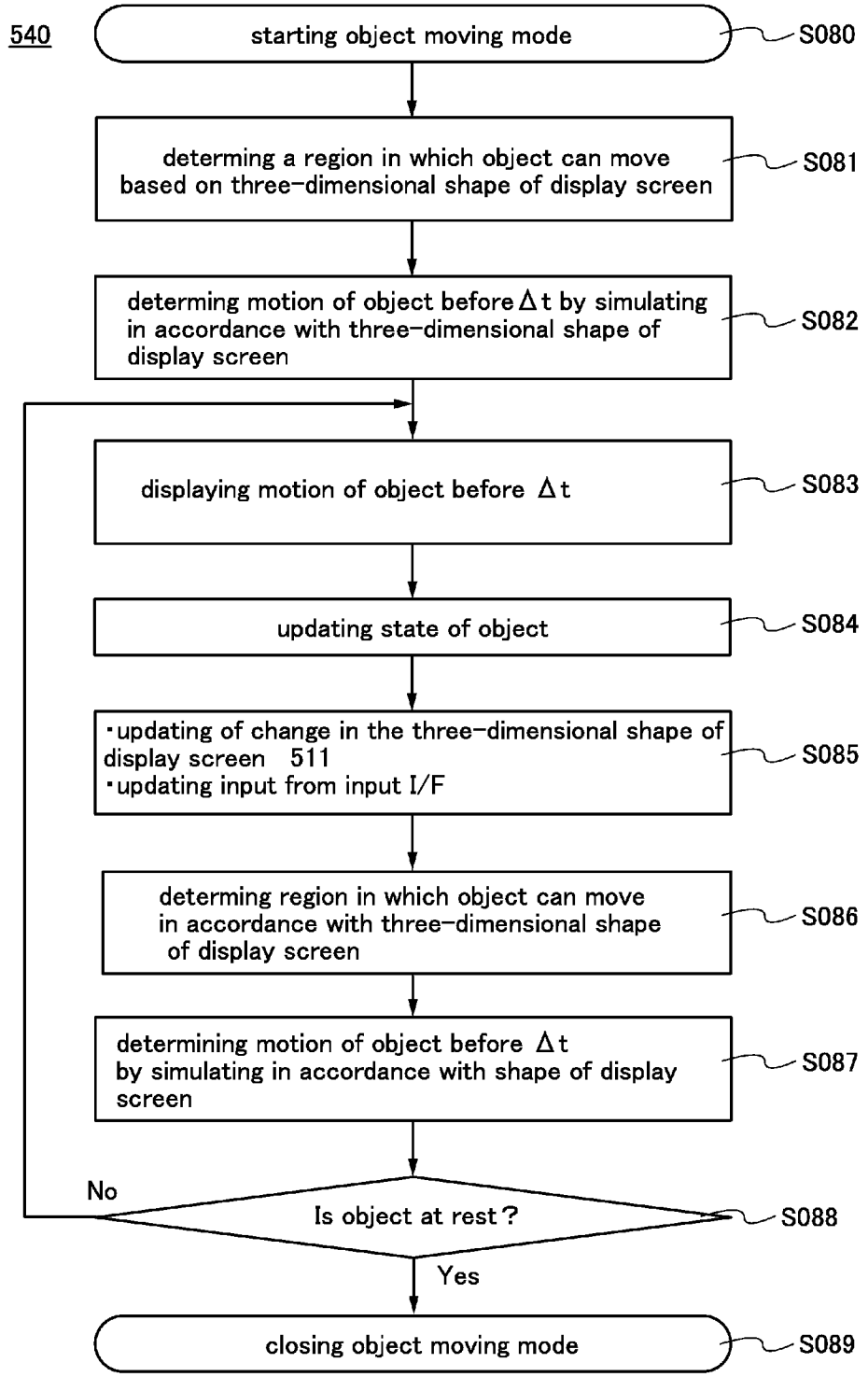

ELECTRONIC DEVICE, STORAGE MEDIUM, PROGRAM, AND DISPLAYING METHOD

TECHNICAL FIELD

The present invention relates to an electronic device whose display screen has flexibility, a storage medium which stores a program for performing a display in the electronic device, a program for performing a display in the electronic device, and a method for performing a display in the electronic device.

BACKGROUND ART

In recent years, portable information terminals such as mobile phones or smartphones, portable music reproducing devices, portable game machines, and other consumer portable electronic devices with high performance which include display devices have become so widespread as to change the lifestyle of the people of today.

Development of such portable electronic devices is further promoted; as well as multifunctionality of the devices, development in terms of external features, such as a reduction in size or weight, is also actively pursued. In addition, as next-generation portable electronic devices, flexible electronic devices in the form of a sheet are being actively researched and developed.

The e-book reader disclosed in Patent Document 1 has a flexible housing and a positional sensor and a bending sensor which detect a bended part of the e-book reader. Contents displayed on a display portion are switched on the basis of results of the detection by the positional sensor and the bending sensor, whereby a user can control the display without using a mouse or a button owing to the flexibility of the housing.

REFERENCE

Patent Document

[Patent Document 1] Japanese Published Patent Application No. 2010-157060

DISCLOSURE OF INVENTION

Meanwhile, in such a flexible portable electronic device, even though operation utilizing the flexibility is possible, displayed still images or moving images are flat, where the flexibility of the display screen and the electronic device which includes the display screen is not sufficiently utilized. In this manner, the product planning has failed to achieve a synergistic effect of the flexibility of the display screen and the multifunctionality of the electronic device, which makes the electronic device including a flexible display portion less attractive to users.

In view of the above, an object of one embodiment of the present invention is to provide an electronic device which displays an object (a body) on a flexible display screen in accordance with a three-dimensional shape of the display screen by utilizing the flexibility of the display screen.

Another object of one embodiment of the present invention is to provide a program for displaying an object on a flexible display screen in accordance with a three-dimensional shape of the display screen by utilizing the flexibility of the display screen.

Thus, one embodiment of a structure of the invention disclosed in this specification is an electronic device which includes a display portion including a flexible display device displaying an object on a display screen; a detection portion detecting positional data of a given part of the display screen; and an arithmetic portion calculating a three-dimensional shape of the display screen on the basis of the positional data and computing motion of the object to make the object be displayed to move according to a given law in accordance with the calculated three-dimensional shape of the display screen.

Another embodiment of a structure of the invention disclosed in this specification is a computer-readable storage medium storing a program for making an electronic device which includes a flexible display device displaying an object on a display screen execute a first step of detecting positional data of a given part of the display screen; a second step of calculating a three-dimensional shape of the display screen on the basis of the positional data; a third step of computing motion of the object to make the object be displayed to move according to a given law in accordance with the calculated three-dimensional shape of the display screen; and a fourth step of displaying the computed motion of the object on the display screen.

A further embodiment of a structure of the invention disclosed in this specification is a program for making an electronic device which includes a flexible display device displaying an object on a display screen execute a first step of detecting positional data of a given part of the display screen; a second step of calculating a three-dimensional shape of the display screen on the basis of the positional data; a third step of computing motion of the object to make the object be displayed to move according to a given law in accordance with the calculated three-dimensional shape of the display screen; and a fourth step of displaying the computed motion of the object on the display screen.

A still further embodiment of a structure of the invention disclosed in this specification is a displaying method which uses an electronic device including a flexible display device displaying an object on a display screen and includes a step of detecting positional data of a given part of the display screen; a step of calculating a three-dimensional shape of the display screen on the basis of the positional data; a step of computing motion of the object to make the object be displayed to move according to a given law in accordance with the calculated three-dimensional shape of the display screen; and a step of displaying the computed motion of the object on the display screen.

An electronic device according to one embodiment of the present invention includes, in its category, a portable electronic device such as a mobile phone, a PHS, a smartphone, a personal computer, a personal digital assistant (PDA), a tablet PC, a laptop PC, a mini computer, an e-book reader (electronic paper), an electronic dictionary, an electronic notebook, a calculator, a navigation system, a digital photo frame, an image reproducing device, an IC recorder, or a portable game machine.

In a flexible display screen and an electronic device which includes the flexible display screen, a detection portion in which a plurality of sensors are provided in matrix, for example, is provided directly under a display device including the flexible display screen. Positional data detected by the sensors and the like are combined and a curved shape of a display portion is calculated. An object is displayed to move according to a given law in accordance with the curved shape of the display screen (a three-dimensional shape of the display screen).

Note that a "three-dimensional shape of the display screen" refers to a physical form of the display screen which is altered (e.g., curved or bended) by application of external force on the electronic device or the display device, which can be defined by three-dimensional space coordinates. Thus, the three-dimensional shape also includes, in its category, a two-dimensional shape before or after deformation (i.e., a flat shape without a curve).

"An object is displayed to move according to a given law in accordance with a three-dimensional shape of the display screen" means that, for example, in the case where the display screen is warped downward, the object (body) displayed on the display screen is displayed to move in accordance with force imaginarily applied to the object, which is, for example, force in the natural world such as gravity. The object may be a solid (e.g., a dice, a fallen leaf, or a marble) or liquid (e.g., water). Further, all things in nature including gas and powder can be defined as the object. Accordingly, a user can feel a sense of reality as if the object exists on the surface of the electronic device.

Moreover, the object may be a living thing. For example, in electronic games or the like, the object can be a character in the form of a person, an animal, a plant, or an imaginary creature.

A "given law" refers to a law which can be expressed by a given equation. For example, it refers to a physical law of the natural world, specifically a law which defines motion of a body. More specific examples are laws, which can be expressed by equations of motion visually descriptive of mechanics, of gravity, attractive force, frictional force, air resistance, motion of a rigid or fluid body, and the like. However, a "given law" is not limited to physical laws of the natural world. For example, to enhance a visual effect, the given law may be a law which is accentuated with deviation from a physical law of the natural world, or a law violating the natural law, by which an object floats defying gravity, for example. In addition, such an equation does not necessarily represent a physical law of the natural world exactly, and may be a pseudo equation or an equation simplified.

The detection portion has sensors which are provided in a plurality of given positions for calculation of a three-dimensional shape of the display screen of the electronic device. For example, it is possible to provide a plurality of positional sensors in matrix in the vicinity of the display screen as the sensors so that the positional sensors detect relative positional coordinates. It is also possible to provide a plurality of acceleration sensors in matrix in the vicinity of the display screen as the sensors so that the acceleration sensors detect relative change in acceleration of each part, which accompanies deformation of the display screen. The sensors are not limited to the above ones and can be sensors to which, for example, a mechanical, electromagnetic, thermal, acoustic, or chemical means is applied as long as the sensors can detect parameters necessary for the calculation of a three-dimensional shape of the display screen. For example, an acceleration sensor, an angular velocity sensor, a vibration sensor, a pressure sensor, a gyroscope sensor, or the like can be used as the sensors. Alternatively, these sensors may be combined to be used.

Note that the present invention includes, in its scope, a method, hardware (e.g., an electronic device, a computer, a semiconductor device, or a storage medium), a system, a program, software, and the like in which the operations in the present invention are achieved.

An electronic device can be provided which displays an object on a flexible display screen in accordance with a three-dimensional shape of the display screen by utilizing the flexibility of the display screen.

A program for displaying an object on a flexible display screen in accordance with a three-dimensional shape of the display screen by utilizing the flexibility of the display screen can be provided.

Thus, a user interface (UI) can be provided which can offer a user a sense of reality as if an object displayed on the display screen exists on the surface of the electronic device.

BRIEF DESCRIPTION OF DRAWINGS

FIG. 2 is a block diagram illustrating one mode of a hardware structure of an electronic device.

FIG. 4 is a functional block diagram illustrating one mode of an electronic device.

FIG. 7 is a flow chart illustrating steps of displaying an object.

FIG. 8 is a flow chart illustrating steps of displaying an object.

FIG. 19 is a flow chart illustrating steps of displaying an object.

BEST MODE FOR CARRYING OUT THE INVENTION

Hereinafter, embodiments of the invention disclosed in this specification will be described with reference to the accompanying drawings. Note that the invention disclosed in this specification is not limited to the following description, and it is easily understood by those skilled in the art that modes and details can be variously changed without departing from the spirit and the scope of the invention. Therefore, the invention disclosed in this specification is not construed as being limited to the description of the following embodiments.

(Embodiment 1)

In this embodiment, one mode of a structure of an electronic device which has a flexible display screen and one mode of a method for performing a display on the display screen are described with reference to FIGS. 1A to 1D, FIG. 2, FIG. 3, FIG. 4, FIGS. 5A and 5B, FIGS. 6A to 6C, FIG. 7, FIG. 8, FIG. 9, FIG. 10, FIG. 11, FIG. 12, and FIG. 13.

(Structure of the Electronic Device)

Figure 1A:
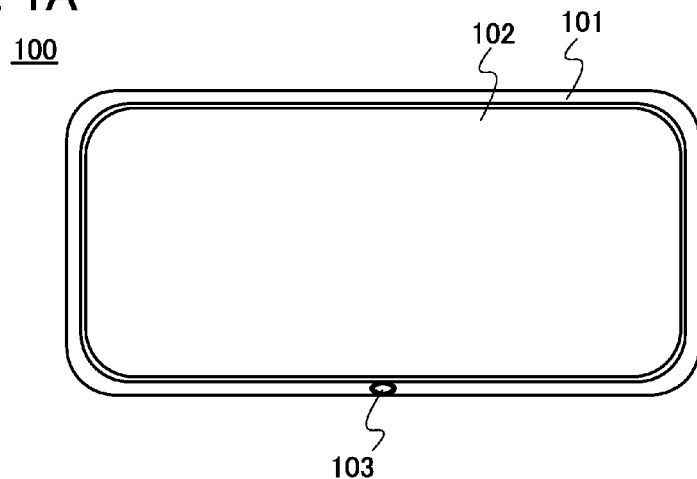
FIGS. 1A to 1D illustrate one mode of an electronic device.

An example of a structure of the electronic device which has a flexible display screen according to one embodiment of the present invention is described with reference to FIGS. 1A to 1D. This embodiment describes an example in which the electronic device is a portable information terminal capable of executing a variety of applications such as mobile phone calls, e-mailing, viewing and editing texts, music reproduction, Internet communication, and a computer game. FIG. 1A is a top view of an electronic device 100. The electronic device 100 includes a housing 101, a display screen 102, and a home button 103.

The display screen 102 is a part of a display device which displays images including a still image and a moving image. As the display device including the display screen 102, there are a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; a quantum dot display; and the like. The display screen according to one embodiment of the present invention is a part of any of these display devices, and a flexible display device is used as the display device including the display screen.

In this embodiment, a touch panel with which data can be input by an instruction means such as a finger or a pen is provided as an input means on the display screen 102. Since the touch panel is provided, a region for a keyboard on the electronic device becomes unnecessary and thus the display screen can be provided in a large region. Moreover, since data can be input with a pen or a finger, a user-friendly interface can be obtained. Although the touch panel may be of any of various types such as a resistive type, a capacitive type, an infrared ray type, an electromagnetic induction type, and a surface acoustic wave type, a resistive type or a capacitive type is particularly preferable since the display screen 102 according to one embodiment of the present invention can be curved.

Since the display screen 102 is flexible, the housing 101 also needs to have deformability. The housing 101 is preferably formed using an elastic resin material, a plastically deformable metal material, a combination thereof, or the like. For example, a pressed metal plate can be used for the four corners of the housing 101 and a plastic molded body can be used for the other parts. Note that although not shown, it is also possible to use a material which is not flexible for the housing 101 when only the display device including the display screen 102 has flexibility and a space is provided between the display device and the housing 101. In this case, the housing 101 may be partly pleated, for example, so that the housing 101 can be stretched and shrunk as the display screen 102 is curved.

As illustrated in FIG. 1A, the electronic device 100 described in this embodiment has a rectangular shape in which a long side is longer than a short side. The reason for this is that with this shape, curving in a direction perpendicular to the long side is particularly easily performed, so that a user can feel a feature of the flexibility of the electronic device 100 more strongly. However, by a 90° turn of the electronic device 100, it can be used as a vertically oriented display device with a short side at the bottom. To realize this, an acceleration sensor or the like may be provided in the electronic device 100, in which case the acceleration sensor detects rotation of the electronic device 100 and a display on the display screen 102 is switched from a landscape orientation to a portrait orientation.

The four corners of the electronic device 100 are rounded. Since the electronic device 100 has its four corners rounded, concentration of stress at edges of the four corners due to bending or twisting can be relieved, which can lead to an improvement in durability of the display device and the electronic device 100.

Further, so that the electronic device 100 can be easily curved, the thickness of the electronic device 100 is preferably as small as possible in a range which ensures a certain strength.

The shape of the electronic device 100 which is illustrated in FIG. 1A is merely an example and the present invention is not limited thereto; a square, a circle, an ellipse, or the like can be employed as demanded by users.

The home button 103 is provided on the lower middle part of the upper surface of the housing of the electronic device 100. When the home button 103 is pressed, a home screen is displayed on the display screen 102. Further, the electronic device 100 may be configured such that main power supply of the electronic device 100 is turned off with a press of the home button 103 for a given time. A structure may also be employed in which a press of the home button 103 brings the device which is in a sleep mode out of the sleep mode. Besides, the home button can be used as a switch for starting a variety of functions, for example, in accordance with the length of time for pressing or by pressing the home button at the same time as another button. When the home button 103 has a variety of functions as described above, the buttons actually provided on the housing 101 can be reduced in number so as to simplify the structure and the design of the electronic device 100. The number of buttons provided on the housing 101 is preferably made as small as possible so that the electronic device 100 according to one embodiment of the present invention, which has flexibility, becomes less trouble-prone and has high reliability.

Figure 1B:
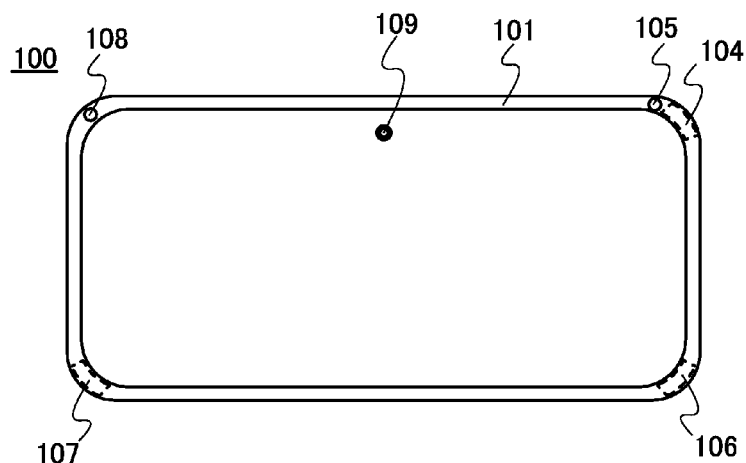

The undersurface (bottom surface) of the electronic device 100 is illustrated in FIG. 1B. The undersurface of the electronic device 100 has a slightly smaller area than the upper surface. That is, a side surface of the electronic device 100 has a shape which slopes from the upper surface to the undersurface. As illustrated in FIG. 1B, the side surface of the electronic device 100 has a plurality of input-output functions including buttons.

A volume control button 104 and a mute button 105 are provided on the upper right corner of the side surface of the electronic device 100. A speaker 107 for outputting sound is provided on the lower left corner of the side surface of the electronic device 100. The speaker 107 outputs various kinds of sound, examples of which are sound set for predetermined processing such as startup sound of an operating system (OS), sound from sound files executed in various applications, such as music from music reproduction application software, and an incoming e-mail alert. Specifically, in the electronic device 100 according to one embodiment of the present invention, the speaker 107 may output sound in response to a curve of the display screen 102, or may output sound in response to move of an object, which will be described later.

In addition, the volume of sound output from the speaker 107 can be adjusted with the volume control button 104. Sound from the speaker 107 can be silenced instantaneously by a press of the mute button 105. Although not shown, a connector for outputting sound to a device such as headphones, earphones, or a headset may be provided together with or instead of the speaker 107 for outputting sound.

A microphone 106, which can be used for sound input and recording, is provided on the lower right corner of the side surface of the electronic device 100. Further, a sleep button 108 is provided on the upper left corner of the side surface of the electronic device 100. The electronic device 100 can be put into the sleep mode when the sleep button 108 is pressed, in which case power can be saved by stopping given functions such as a display on the display screen 102 with the main power supply on. In this manner, consumption of power of a battery incorporated in the electronic device 100 can be suppressed.

When a variety of input-output devices are locally provided on the four corners of the electronic device 100 as described above, parts which do not have flexibility can be concentrated in the four corners, which allows the electronic device 100 to have flexibility as a whole. In the case where a non-flexible member is used for the four corners, the structural strength of the electronic device 100 increases and the usability of the electronic device 100 can be enhanced. Therefore, for the four corners of the housing 101 of the electronic device 100, a non-flexible member which is different from materials of the other parts is preferably used.

In contrast, a camera 109 is provided on the upper middle part of the undersurface of the electronic device 100. Images obtained with the use of the camera 109 can be displayed on the display screen 102. Note that providing the camera 109 on the middle part allows the user to know where the camera 109 is positioned even in the case where the user operates the electronic device 100 while seeing its upper surface. Since the electronic device 100 according to one embodiment of the present invention has flexibility, it is possible to capture blur-free images by standing the electronic device 100 which is curved into a U shape on a table or the like, without using a fixture such as a tripod.

Note that although not shown, the electronic device 100 may include a terminal for connecting an external memory drive. Examples of the external memory drive are storage medium drives such as an external hard disk drive (HDD), a flash memory drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and a nonvolatile solid state drive (SSD) device different from the above flash memory drive. Although the electronic device 100 has the touch panel on the display screen 102, a keyboard may be provided on the housing 101 instead of the touch panel or may be externally added.

Figure 1C:
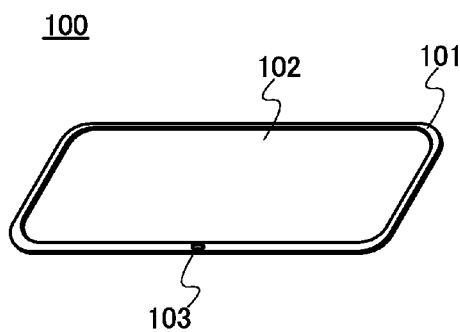
Figure 1D:
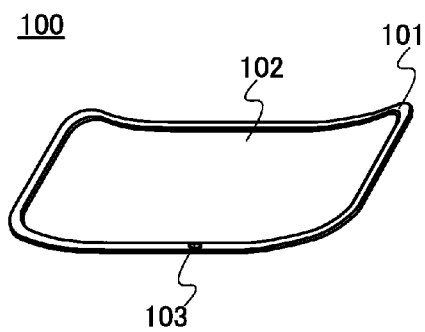

The above-described electronic device 100 has flexibility as illustrated in FIGS. 1C and 1D. For example, FIG. 1D illustrates the electronic device 100 whose right and left end portions are curved upward. In this manner, the housing 101 and the display screen 102 can be curved. Note that the flexibility of the electronic device in this specification achieves at least part of the effect of the invention disclosed in this specification, and the degree, direction, or the like of curving of the electronic device is not particularly limited.

FIG. 2 is an example of a block diagram illustrating a hardware structure of the electronic device 100 in this embodiment which has flexibility. The electronic device 100 includes a processor 151, a main memory 152, a memory controller 153, an auxiliary memory 154, a sensor controller 155, sensors 156, a display controller 157, a display device 158, a power supply controller 159, a power supply 160, a communication controller 161, a communication interface (I/F) 162, a sound controller 163, a speaker 164, a sound output connector 165, a microphone 166, an input interface 167, a housing switch 168, a touch panel 169, a keyboard 170, a camera 171, an external port 172, an output interface 173, and a vibration motor 174. Among these, the processor 151, the main memory 152, the memory controller 153, the sensor controller 155, the display controller 157, the power supply controller 159, the communication controller 161, the sound controller 163, the input interface 167, and the output interface 173 are connected to one another through one or more system buses 150 and can communicate with one another.

The above structure of the electronic device 100 is merely an example and some of the components can be omitted; for example, the keyboard 170 can be omitted, in which case a virtual keyboard using the touch panel 169 and the display device 158 is produced with software. Moreover, a component other than the above may be added to the structure.

For the processor 151, a microprocessor such as a digital signal processor (DSP) or a graphics processing unit (GPU) can be used in addition to a central processing unit (CPU). The processor 151 interprets and executes instructions from various programs to process various kinds of data and control programs.

Note that a thin film transistor in which a channel formation region includes an oxide semiconductor can be used for the processor 151. Because the transistor has extremely low off-state current, by using the transistor as a switch for holding electric charge (data) flowed into a memory element, a long data retaining period can be ensured. By utilizing the above characteristics for a register of the processor 151 or the like, the processor 151 can operate only when needed and the contents of the previous processing can be stored in the memory element in the rest of the time, so that normally off computing can be performed; thus, power consumption of the electronic device can be reduced.

Figure 3:
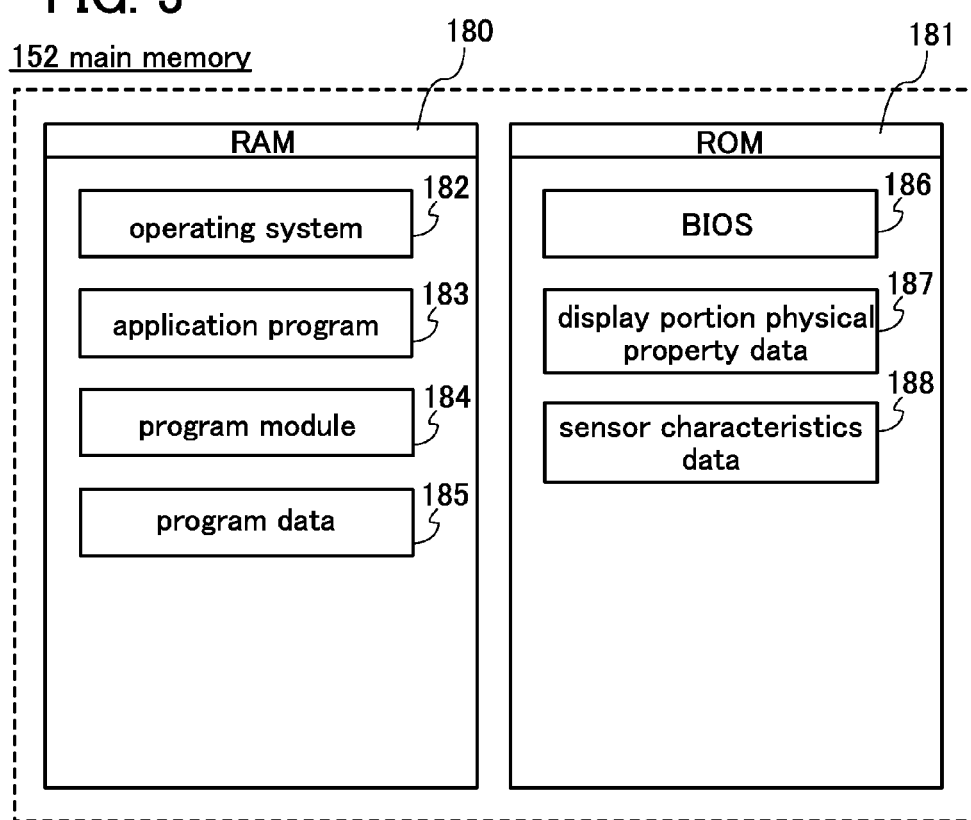
FIG. 3 is a block diagram illustrating a structure of a memory.

The main memory 152 is used as a main memory device. FIG. 3 is a block diagram illustrating a structure of the main memory 152. The main memory 152 has a volatile memory and a nonvolatile memory such as a random access memory (RAM) 180 and a read only memory (ROM) 181.

A dynamic random access memory (DRAM), for example, is used for the RAM 180, and a memory space as a workspace for the processor 151 is virtually allocated and used. As illustrated in FIG. 3, an operating system 182, an application program 183, a program module 184, program data 185, and the like which are stored in the auxiliary memory 154, which is an HDD or the like, are loaded into the RAM 180 to be executed. The data, program, and program module which are loaded into the RAM 180 are directly accessed and operated by the processor 151. Note that in FIG. 3, a memory controller for controlling the data or the like stored in the RAM 180 is assumed to be incorporated in the processor 151 and is not illustrated; however, a memory controller for controlling the main memory 152 may be separately provided.

In the ROM 181, a basic input/output system (BIOS) 186, firmware, and the like for which rewriting is not needed are stored. Further, display portion physical property data 187 including physical parameters of the display screen 102 having flexibility according to one embodiment of the present invention, and sensor characteristics data 188 concerning the characteristics of the sensors 156 which detect positional data can be stored in the ROM 181 in advance. As the ROM 181, a mask ROM, a one time programmable read only memory (OTPROM), or an erasable programmable read only memory (EPROM) can be used. As an EPROM, an ultra-violet erasable programmable read only memory (UV-EPROM) which can erase stored data by irradiation with ultraviolet rays, an electrically erasable programmable read only memory (EEPROM), a flash memory, and the like can be given.

The auxiliary memory 154 incorporated in the electronic device 100 functions as an auxiliary memory device. The auxiliary memory 154 is a storage medium having a larger capacity than the main memory 152, and is connected to the system bus 150 through the memory controller 153. The memory controller 153 functions as an interface which controls reading and writing of data from and into the auxiliary memory 154, for example. For the auxiliary memory 154, a storage medium drive such as a hard disk drive (HDD) or a nonvolatile solid state drive (SSD) device can be used, for example.

Note that although being incorporated in the electronic device 100 in FIG. 2, the auxiliary memory 154 may be an external memory device which is provided outside the electronic device 100 and connected through the external port 172; moreover, the external memory device and the auxiliary memory 154 may be combined to be used as the auxiliary memory device.

The sensors 156 detect parameters necessary for calculating a three-dimensional shape of the display screen of the electronic device 100. For example, as the sensors 156, a plurality of positional sensors which can specify a positional relation relative to each other can be provided in matrix in the vicinity of the display screen so that the positional sensor detects positional data relative to the other positional sensors. It is also possible to provide a plurality of acceleration sensors in matrix in the vicinity of the display screen as the sensors 156 so that the acceleration sensors detect relative change in acceleration of each part, which accompanies deformation of the display screen. The sensors 156 are not limited to the above ones and can be sensors to which, for example, a mechanical, electromagnetic, thermal, acoustic, or chemical means is applied as long as the sensors can detect parameters necessary for the calculation of a three-dimensional shape of the display screen. For example, an acceleration sensor, an angular velocity sensor, a vibration sensor, a pressure sensor, a gyroscope sensor, or the like can be used as the sensors. Alternatively, these sensors may be combined to be used. Note that the sensors 156 may be incorporated in touch sensors provided on the display screen 102. By combining the touch sensors and the positional sensors into one component, the number of parts can be reduced, which can contribute to a reduction in the thickness of the electronic device 100.

The sensor controller 155 is an interface which performs centralized control of the plurality of sensors 156. The sensor controller 155 supplies power from the power supply 160 to the plurality of sensors 156, and receives input from the sensors 156, converts it into a control signal, and outputs the signal to the system bus 150. The sensor controller 155 may handle errors made by the sensors 156 or may calibrate the sensors 156.

The display device 158 is connected to the system bus 150 through the display controller 157. As the display device 158, a display device having flexibility and selected from a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; a quantum dot display; and the like is used. In response to drawing instructions input from the processor 151 through the system bus 150, the display controller 157 controls the display device 158 so that a predetermined image is displayed on the display screen 102 of the display device 158.

The power supply 160 supplies power to a plurality of components of the electronic device 100. As the power supply 160, for example, one or more primary batteries or secondary batteries are included. In the case of indoor use or the like, an alternate-current (AC) power supply may be used as an external power supply. Particularly in the case of using the electronic device 100 separately from the external power supply, it is favorable that the power supply have a large charge/discharge capacity which allows the electronic device 100 to be used for a long time. When the power supply 160 is charged, a charger separate from the electronic device 100 may be used. Further, since the electronic device 100 in this embodiment is flexible, it is preferable that the power supply 160 be also flexible. As a secondary battery having such a feature, for example, a lithium ion secondary battery and a lithium ion polymer secondary battery can be given. It is preferable that a laminate package be used as a jacket of the battery so that the battery has flexibility.

Further, although not shown, the power supply 160 may have a power supply management device (battery management unit: BMU). The BMU collects data on cell voltage or cell temperatures of the battery, monitors overcharge and overdischarge, controls a cell balancer, handles a deterioration state of the battery, calculates the remaining battery power (state of charge: SOC), and controls detection of a failure, for example.

The power supply controller 159 controls transmission of power from the power supply 160 to each component through the system bus 150 or a power supply line. The power supply controller 159 has a power converter or an inverter with a plurality of channels, a protection circuit, and the like. Further, the power supply controller 159 has a function of reducing power consumption. For example, after detection of no input to the electronic device 100 for a given period, the power supply controller 159 lowers clock frequency or stops input of clocks of the processor 151, stops operation of the processor 151 itself, or stops rotation of the HDD, thereby reducing the power consumption. Such a function is performed with the power supply controller 159 alone or the power supply controller 159 interlocking with the processor 151.

The communication interface (I/F) 162 is connected to the system bus 150 through the communication controller 161. The communication controller 161 and the communication I/F 162 control, in response to instructions from the processor 151, a connection signal for connecting the electronic device 100 to a computer network, and transmit the signal to the computer network. Accordingly, communication can be performed by connecting the electronic device 100 to a computer network such as the Internet (which is an infrastructure of the World Wide Web (WWW)), an intranet, an extranet, a personal area network (PAN), a local area network (LAN), a campus area network (CAN), a metropolitan area network (MAN), a wide area network (WAN), or a global area network (GAN).

In the case where communication between the electronic device 100 and another device is performed without a transmission line, i.e., wirelessly, a radio-frequency (RF) circuit may be provided in the communication interface (I/F) 162 so that an RF signal is transmitted and received. The RF circuit performs conversion between an electromagnetic signal and an electric signal in a frequency band which is set by a national law, and performs communication with another communication device wirelessly with the use of the electromagnetic signal. Several tens of kilohertz to several tens of gigahertz is a practical frequency band which is generally used. The RF circuit includes an RF circuit portion and an antenna which are compatible with a plurality of frequency bands; the RF circuit portion can include an amplifier, a mixer, a filter, a digital signal processor (DSP), an RF transceiver, or the like. In the case of performing wireless communication, it is possible to use, as a communication protocol or a communication technology, a communications standard such as Global System for Mobile Communication (GSM) (registered trademark), Enhanced Data Rates for GSM Evolution (EDGE), Code Division Multiple Access 2000 (CDMA2000), or Wideband Code Division Multiple Access (W-CDMA), or a communications standard developed by IEEE such as Wireless Fidelity (Wi-Fi) (registered trademark), Bluetooth (registered trademark), or ZigBee (registered trademark).

Further, in the case where the electronic device 100 is used as a phone for a telephone conversation, the communication controller 161 and the communication I/F 162 control, in response to instructions from the processor 151, connection signals for connecting the electronic device 100 to a telephone line, and transmit the signal to the telephone line.

The speaker 164, the sound output connector 165, and the microphone 166, which are responsible for sound, are connected to the sound controller 163 to be connected to the processor 151 through the system bus 150. The sound controller 163 generates analog sound signals audible to the user in response to instructions from the processor 151, and outputs the signals to the speaker 164 or the sound output connector 165. Sound data input to the microphone 166 is converted into a digital signal in the sound controller 163 and processed in the sound controller 163 and the processor 151. To the sound output connector 165, a sound output device such as headphones, earphones, or a headset is connected and sound generated in the sound controller 163 is output to the device.

One or more switches provided on the housing (hereinafter referred to as the housing switches 168 for convenience), the touch panel 169 provided in the vicinity of the display screen 102, the keyboard 170 provided on the housing 101, the camera 171 provided on the undersurface of the housing 101, and the external port 172 to which other input components can be connected are controlled by the input interface 167, and the input interface 167 is connected to the processor 151 and the like through the system bus 150.

The housing switches 168 correspond to, for example, the home button 103, the volume control button 104, the mute button 105, the sleep button 108, and the like which are illustrated in FIGS. 1A to 1D. As well as these housing switches 168, the touch panel 169, the keyboard 170, the camera 171, and the external port 172, the microphone 166 for sound input and the sensors 156 detecting change in the shape of the display screen 102 serve as interfaces between the user and the electronic device 100.

The touch panel 169 is provided on the display screen 102 and can be used as an input device by which data is input with an instruction means such as a finger or a pen. Since the touch panel 169 is provided, a region for a keyboard on the electronic device becomes unnecessary and thus the display screen can be provided in a large region. Moreover, since data can be input with a pen or a finger, a user-friendly interface can be obtained. Although the touch panel 169 may be of any of various types such as a resistive type, a capacitive type, an infrared ray type, an electromagnetic induction type, and a surface acoustic wave type, a resistive type or a capacitive type is particularly preferable since the display screen 102 according to one embodiment of the present invention can be curved. Note that the touch panel 169 may include the sensors 156 to serve as one component. This structure allows the number of parts to be reduced and contributes to a reduction of the thickness of the electronic device 100.

The vibration motor 174 is connected to the system bus 150 through the output interface 173. In response to instructions from the processor 151, the output interface 173 controls vibration time and the like and makes the vibration motor 174 vibrate. Accordingly, the electronic device 100 is made to vibrate and the vibration can be used as haptic effects to the user at the time of reception of e-mails or execution of applications such as computer games. The vibration motor 174 may be made to vibrate in accordance with the degree of a curve of the display screen 102; for example, when the flexibility of the display screen 102 is limited to a certain degree, the vibration motor 174 can be used to alert the user that the threshold value is exceeded. Although not shown, as well as the vibration motor 174, a variety of output devices with which the user can perceive by the use of the five senses can be connected to the output interface 173. For example, a light-emitting device for showing an operation status of the electronic device 100, an aroma diffuser which releases fragrance in response to vibration, or the like can be connected to the output interface 173.

(Functions of the Electronic Device)

Next, FIG. 4 shows a block diagram illustrating main functions of the electronic device 100 in this embodiment. The electronic device 100 has at least four function blocks of a display portion 201, a detection portion 202, an arithmetic portion 203, and a storage portion 204. An input portion 205 and an output portion 206 may be additionally included.

The display portion 201 includes the display device 158 and the display controller 157 described with reference to FIG. 2, and the like, and displays a field, an object, or the like on the display screen of the display device 158. At least the display device 158 has flexibility and can be deformed. On the display screen 102 of the display device 158, an object which moves in accordance with change in the shape of the display screen 102 is displayed. The object here is a body displayed on the display screen 102 and being in motion in response to the deformation of the display screen 102. Further, the field is a background of the object in motion and is a ground that affects the motion of the object.

A graphic expression of the field may be an arrangement of textures that represent materials or may be transparent.

The detection portion 202 includes the sensors 156 and the sensor controller 155 described with reference to FIG. 2, and the like, and detects positional data of the display screen 102 of the display device 158. For example, the plurality of sensors 156 are provided in matrix and, at the respective provision sites, each of the sensors 156 obtains positional data relative to the other sensors 156. The positional data obtained by the sensors 156 is output to the arithmetic portion 203 through the sensor controller 155.

The arithmetic portion 203 includes the processor 151 described with reference to FIG. 2, and the like. To the arithmetic portion 203, the positional data of the sites of the display screen 102 which is output from the detection portion 202 is input, and the arithmetic portion 203 calculates a three-dimensional shape of the display screen 102 on the basis of the data. The calculation of a three-dimensional shape of the display screen 102 may be performed as appropriate in consideration of the sensors 156 or a mode of the calculation to be used. At the time of the calculation of a three-dimensional shape of the display screen 102, when comparison with the latest data of data on a three-dimensional shape of the display screen 102 which has already been calculated is performed and the amount of change is computed to obtain a new three-dimensional shape of the display screen 102, computational burdens on the processor 151 can be reduced. At least the latest data of the data on the three-dimensional shape of the display screen 102 which has already been calculated is stored in the storage portion 204. It is also possible to calculate a three-dimensional shape of the display screen 102 by comparison between positional data which has already been obtained by the sensors 156 and positional data newly obtained by the sensors 156 and addition of the amount of change to the three-dimensional shape of the display screen 102. In that case, at least the latest data of the positional data which has already been obtained by the sensors 156 is stored in the storage portion 204.

After calculating the three-dimensional shape of the display screen 102, the arithmetic portion 203 makes the object move on the field in accordance with the calculated three-dimensional shape of the display screen 102.

The storage portion 204 includes the main memory 152, the auxiliary memory 154, and the memory controller 153 described with reference to FIG. 2, and the like. In the storage portion 204, at least data on the object, data on the field, and data on a law which defines move of the object are stored. These pieces of data may be included in the operating system, or stored in the storage portion 204 as an application program, a program module, or program data. These pieces of data are stored in the HDD used as the auxiliary memory 154, for example, and loaded into the main memory 152 which includes a DRAM and the like as needed by starting up the electronic device 100.

Figure 5A:
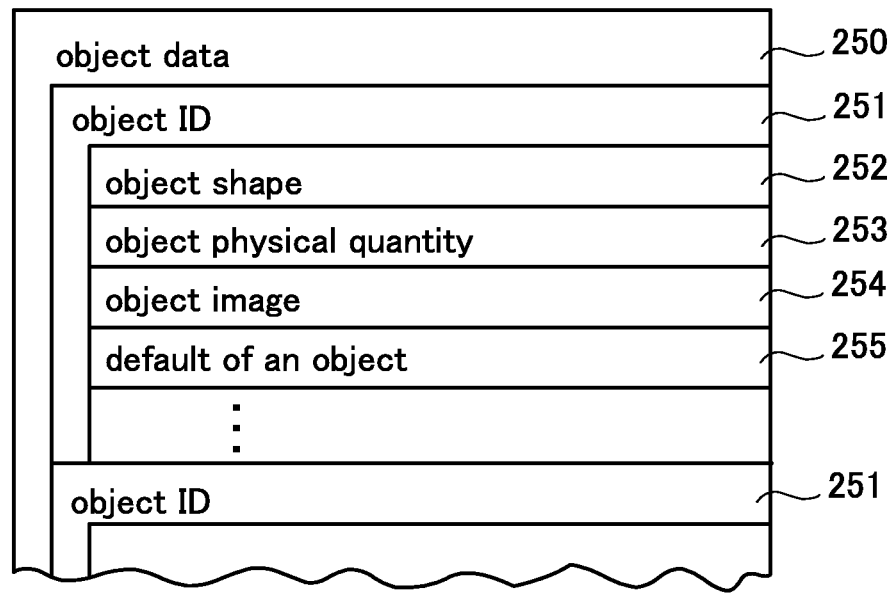
FIGS. 5A and 5B illustrate data structures.

As illustrated in FIG. 5A, the data on the object (object data 250) is an object ID 251, an object shape 252, an object physical quantity 253 such as a set mass or a set surface state (coefficient of friction), an object image 254, and default 255 of the object such as an initial position; these pieces of data can be stored in the storage portion 204 as a structured list, table, or database. In an example shown in FIG. 5A, the data is associated with the object ID 251 to form a layered structure.

Figure 5B:
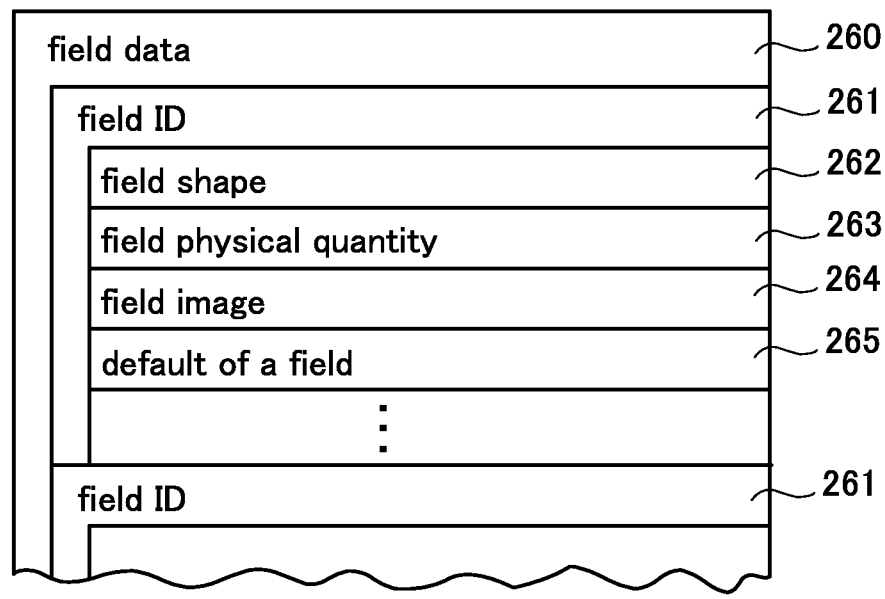

As illustrated in FIG. 5B, the data on the field (field data 260) is a field ID 261, a field shape 262, a field physical quantity 263, a field image 264, and default 265 of the field; these pieces of data can be stored in the storage portion 204 as a structured list, table, or database. In an example shown in FIG. 5B, the data is associated with the field ID 261 to form a layered structure.

The law which defines move of an object refers to a law which can be expressed by a given equation which defines the move of the object. For example, it refers to a physical law of the natural world, specifically a law which defines motion of a body. More specific examples are laws, which can be expressed by equations of motion visually descriptive of mechanics, of gravity, attractive force, frictional force, air resistance, motion of a rigid or fluid body, and the like. However, a "given law" is not limited to physical laws of the natural world. For example, to enhance a visual effect, the given law may be a law which is accentuated with deviation from a physical law of the natural world, or a law violating the natural law, by which an object floats defying gravity, for example. In addition, such an equation does not necessarily represent a physical law of the natural world exactly, and may be a pseudo equation or an equation simplified. Data on a law which defines move of an object is a group of equations which form the basis for simulation of the motion of the object. Although not shown, the data on the law which defines the move of the object can also be stored in the storage portion 204 as a structured list, table, or database.

The arithmetic portion 203 refers to the physical quantities, positional data, and the like which are associated with the object ID and field ID stored in the storage portion 204 and the three-dimensional shape of the display screen 102 which is calculated on the basis of data from the detection portion 202, and simulates motion of the object on the basis of the data on the law which defines the move of the object so that the object moves according to the above law. In other words, in response to change in the shape of the display screen 102, the arithmetic portion 203 calls the object data, the field data, the data on the law which defines the move of the object, and the like as well as data on the change in the shape to the workspace, inserts parameters in equations of the data on the law which defines the move of the object, and calculates the motion of the object. While the calculation of the motion of the object is performed until the motion of the object substantially subsides, the detection portion 202 monitors further change in the shape of the display screen 102 and modifies the motion of the object immediately on detecting change in the shape.

As described above, modification which accompanies the change in the shape of the display screen 102 is repeatedly performed and simulation continues until the motion of the object subsides (i.e., the motion of the object stops), whereby the realistic motion of the object in accordance with the deformation of the display screen 102 can be felt by the user. The motion of the object which is simulated by the arithmetic portion 203 is output to the display portion 201 and displayed on the display screen 102. Note that it is preferable that change in the shape of the display screen 102 have a given threshold value and the arithmetic portion 203 perform computation only when the threshold value is exceeded. In that case, an increase in the calculation amount of the arithmetic portion 203 can be suppressed and the motion of the object can be stopped at a predetermined level.

The input portion 205 includes the microphone 166, the housing switch 168, the touch panel 169, the keyboard 170, the camera 171, the external port 172, the sound controller 163, and the input interface 167 which are described with reference to FIG. 2, and the like. For example, the object displayed on the display screen 102 can move in response to sound input with the microphone 166. Further, although sensors for calculating the shape of the display screen 102 are given as the sensors 156, beside the sensors, sensors as an input interface can be used. For example, by using acceleration sensors for the electronic device 100, the object can be made to move in accordance with the inclination of the electronic device 100. The sensors 156 may be used as such sensors for input.

The output portion 206 includes the speaker 164, the sound output connector 165, the sound controller 163, the vibration motor 174, and the output interface 173 which are described with reference to FIG. 2, and the like. For example, while the object whose motion is determined as described above moves, the electronic device 100 is made to vibrate by control of the vibration motor 174, thereby allowing the user to feel a sense of reality through a haptic sense.

(Example of Operation of the Electronic Device)

Next, an example of operation of the electronic device 100 is described with reference to FIGS. 6A to 6C.

Figure 6A:
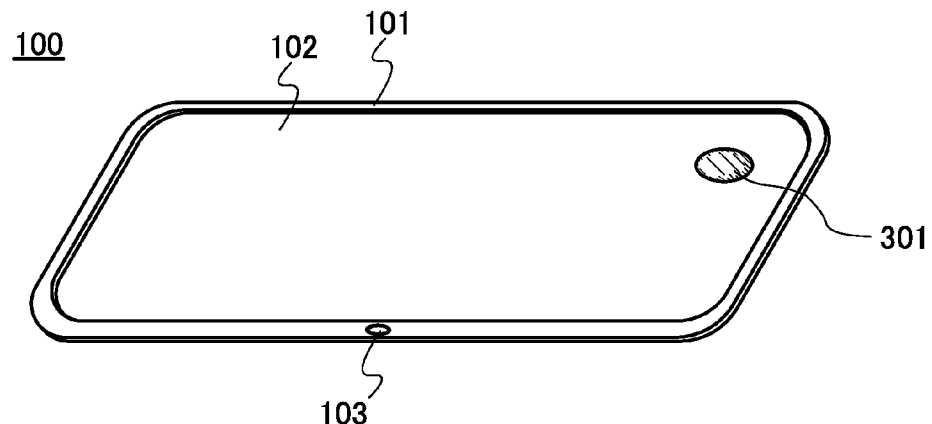
FIGS. 6A to 6C illustrate motion of an object displayed on a display screen.

FIG. 6A is a perspective view illustrating the upper surface of the electronic device 100, and an object 301 is displayed on the display screen 102 of the electronic device 100. In order to describe display operation for the object 301, other displays are not shown in the drawing; however, any other display matters such as a background image, an icon, a toolbar, a pointer, a window, a text, a moving image, or a web browser can be actually displayed at the same time as the object 301.

The object 301 in FIG. 6A is designed to resemble a spherical solid and is at rest at a given position. The range of motion of the object 301 is defined as a field, which functions as a ground that affects the motion of the object 301.

Figure 6B:
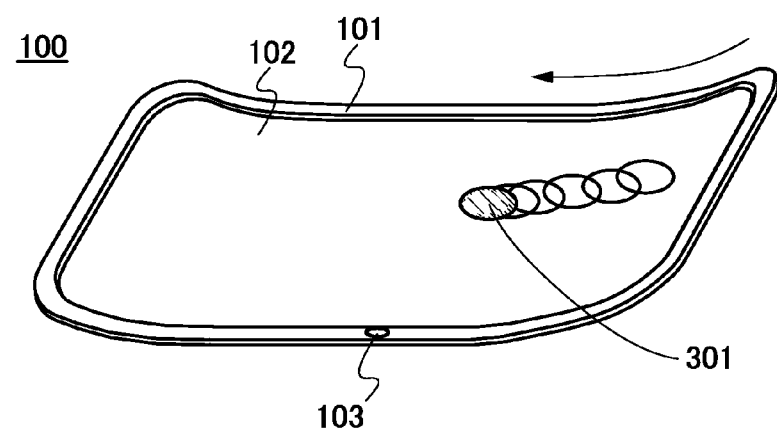

FIG. 6B illustrates the electronic device 100 whose right end portion is curved by being lifted. By the deformation of the electronic device 100, the display screen 102 is also deformed. Data from the plurality of sensors 156 which have detected the deformation is combined and the arithmetic portion 203 calculates the changed shape of the display screen 102. Further, various kinds of data is called from the storage portion 204, and the motion of the object is simulated by the above-described method. The simulation results are displayed on the display screen 102 as the motion of the object. In FIG. 6B, since the right side of the display screen 102 is lifted, the object 301 moves to the center of the display screen 102 as if it is attracted by gravity (in a direction represented by an arrow in the drawing).

In FIG. 6B, the object 301 is a solid sphere. Thus, under Newton mechanics, the object 301 rolls to the center of the display screen 102. Here, the object 301 has a given physical quantity. Therefore, the moving speed and the rolling velocity depend on the mass or the like. The field also has a predetermined physical quantity or the like. For example, the object 301 moves while encountering air resistance set for the field, gravity acceleration set for the field, and friction set for the field.

Applying various laws to the motion of the object 301 as described above allows the user to feel a sense of reality.

Note that all of the physical quantities and the like of the object 301 and the field are not necessarily referred to, and only part of them may be used for reference. When only part is referred to, burdens on the arithmetic portion 203 can be reduced. Similarly, only part of the group of equations which are stored in the storage portion 204 may be used in the simulation. Although only one object 301 is displayed on the field in FIG. 6B, the plurality of objects 301 may be displayed. In that case, the number of data or parameters such as a physical quantity to be referred to or the group of equations may be appropriately adjusted depending on the number of the objects 301 displayed on the display screen 102.

Figure 6C:
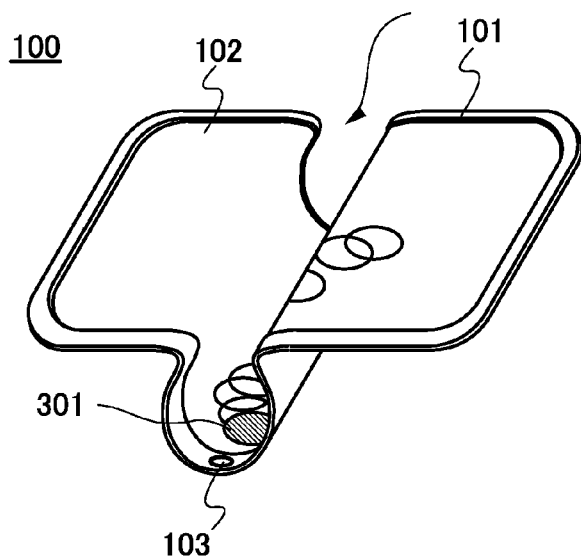

FIG. 6C illustrates motion of the object 301 in the case where the electronic device 100 is deformed by being further curved to protrude downward. For example, the spherical object 301 which has been positioned as illustrated in FIG. 6B falls into the hollow formed by the curving of the display screen 102. The object 301 which has fallen into the hollow is enclosed on both sides by high walls of the display screen 102 and thus cannot move from side to side; the object 301 moves at the bottom of the hollow and stops after a while.

In the above manner, data on the three-dimensional shape of the display screen 102 is calculated using the sensors 156 and the processor 151, whereby the object 301 which moves according to the shape can be displayed. Accordingly, the user can feel a sense of reality as if the object 301 displayed on the display screen 102 exists on the surface of the electronic device 100.

Note that although the deformation of the display screen 102 is a condition for starting move of the object 301 here, the condition is not limited thereto. For example, when acceleration sensors are provided as the input interface 167 in the electronic device 100, detection of acceleration by the acceleration sensors may be the condition for starting move of the object 301. The object 301 can be made to move in a direction in accordance with inclination detected by the acceleration sensors. In addition, when the microphone 166 is used as the input interface 167, the object 301 can be made to move in accordance with the volume of input sound, for example. Alternatively, the object 301 may be made to move in a direction in accordance with a direction input with the keyboard 170. Further, the object 301 may be reset to its initial position by a press of the home button 103, which is provided on the housing 101 of the electronic device 100.

(Procedure for Display Processing of Object)

Next, a procedure for display processing of an object in the electronic device 100 according to one embodiment of the present invention is described with reference to FIG. 7, FIG. 8, FIG. 9, FIG. 10, FIG. 11, FIG. 12, and FIG. 13.

FIG. 7 is a flow chart which shows a procedure 500 for display processing of an object in the electronic device 100 according to one embodiment of the present invention. Here, as an example of the procedure for display processing of an object, an application for displaying the object is described. An example of such an application is a background of a home screen of the electronic device 100, and the like.

Accordingly, the procedure for display processing of an object which is described below is executed by an application program. The program is stored in a computer-readable storage medium such as the auxiliary memory 154 or the main memory 152.

Further, although the program corresponds to software here, such a processing means can also be an electronic circuit or mechanical hardware.

First, an application for displaying an object in the electronic device 100 according to one embodiment of the present invention is started (S001). Here, the application program or the like stored in the auxiliary memory 154 is loaded into the main memory 152. Note that starting of the application may be set to be performed at the same time as startup of the operating system.

Then, initial conditions related to the object and the field are set (S002 and S003). The initial conditions related to the object and the field may be set so that conditions at the time of close of the application in the previous use are transferred, or may be reset to the default settings in every use. Moreover, the user may be allowed to select any of these settings.

The initial conditions of the object set the object ID 251 which is the object data 250 stored in the storage portion 204, display positions, and the like. Further, the initial conditions of the field set the field ID 261 which is the field data 260 stored in the storage portion 204, and the like. Specifically, the setting refers to reading of the object ID 251 and the object physical quantity 253 and the like associated therewith from the auxiliary memory 154, and storing of them in the main memory 152. Similarly, parameters for the field data 260 are also set.

An order in which the setting of the initial conditions related to the object (S002) and the setting of the initial conditions related to the field (S003) are performed is not limited to the above. The setting of the initial conditions related to the field may be performed first, or the setting of the initial conditions related to the object (S002) and the setting of the initial conditions related to the field (S003) may be performed at the same time.

Then, with the plurality of sensors 156 which are provided in the vicinity of the display screen 102, positional data in the respective positions is obtained (S004). After that, on the basis of the positional data obtained with the plurality of sensors 156, the three-dimensional shape of the display screen 102 is calculated in the arithmetic portion 203 (S005). In the case where the shape of the display screen 102 has already been obtained with another system or application after starting of the electronic device 100 and before starting of the application, the three-dimensional shape of the display screen 102 may be calculated using the obtained data on the shape.

Then, the shape of the display screen 102 calculated in Step S005 is compared with the initial state of the object, and whether to make the object move is determined (S006). For example, in the case where the initial position of the object which is set in Step S002 corresponds to a position having an inclination that exceeds a predetermined threshold with respect to a horizontal plane due to a curved shape of the display screen 102, the arithmetic portion 203 determines that move of the object is necessary. In contrast, in the case where the initial position of the object corresponds to a position parallel to the horizontal plane although the display screen 102 has a curved portion, the object is at rest, and thus the arithmetic portion 203 determines that move of the object is not necessary. When the arithmetic portion 203 determines that move of the object is necessary, the processing shifts into an object moving mode 510 (or an object moving mode 520 which will be described as another example) (S007). When the arithmetic portion 203 determines that move of the object is not necessary, the processing shifts into an object standby mode 530 (S008).

When the object standby mode 530 is exited, whether to close the application is judged in Step S009; in the case where the conditions are met (i.e., in the case where an application closing flag which will be described later is "1"), the application is closed (S010), and in the case where the conditions are not met (i.e., in the case where the application closing flag which will be described later is "0"), the processing returns to Step S004.

At the time of closing the application, various kinds of data stored in the main memory 152 is preferably stored in the auxiliary memory 154. Accordingly, the data can be used as the initial settings in the next starting of the application.

FIG. 8 is a flow chart which shows the object moving mode 510 in a procedure for display processing of an object in the electronic device 100 according to one embodiment of the present invention. In the object moving mode 510, simulation of motion of the object is repeated and the results are displayed on the display screen 102 each time. A repetition of the simulation and display of the object is performed every given period (hereinafter referred to as Δt).

After the object moving mode starts (S020), the motion of the object is determined according to the shape of the display screen which has already been calculated (S021). Here, the motion of the object is determined before Δt.

The motion of the object is simulated according to a predetermined law in the arithmetic portion 203. The simulation is executed using the physical quantity of the object, the physical quantity of the field, and the like which are set in Step S002 and Step S003. Through this simulation, the moving direction, speed, and the like of the object are determined. For the simulation of the moving direction, speed, and the like of the object, the field data 260 on the associated field ID 261 is also referred to. For example, in the case where the field physical quantity 263 of the field ID 261 which is selected includes data on an elastic material such as rubber, the motion of the object which bounces after falling into a hollow formed by curving the display screen 102 is simulated. Data on the simulated motion of the object is stored in the main memory 152 of the storage portion 204.

Simulation for displaying rotation, deformation, or the like of the object may be performed to further provide the user with a sense of reality. However, when the simulation is complicated, the arithmetic portion 203 becomes overloaded so that delay in processing of the arithmetic portion 203 inhibits an appropriate display; as a result, a sense of reality offered to the user is diminished. In view of this, it is preferable that computation be simplified or a database of computation results be made, for example, so as to avoid a slowdown in the computation speed.

Then, according to the motion of the object which has been determined by the simulation, the motion of the object is displayed on the display screen 102 for a period of Δt (S022). The motion of the object is affected by coefficient of friction, air resistance, gravity, or the like depending on the field physical quantity 263. Note that motion of the object includes stop of the object. Therefore, Step S023 includes a motion sequence from stop of the object to move of the object, and that from move of the object to stop of the object.

Then, the three-dimensional shape of the display screen 102 is recalculated (Step S023). Specifically, in this step, data stored in the storage portion 204, which is data on the previously calculated three-dimensional shape of the display screen 102, is rewritten with data on the three-dimensional shape of the display screen 102 which is newly obtained by a recalculation sequence 511 for the three-dimensional shape of the display screen.

Figure 9:
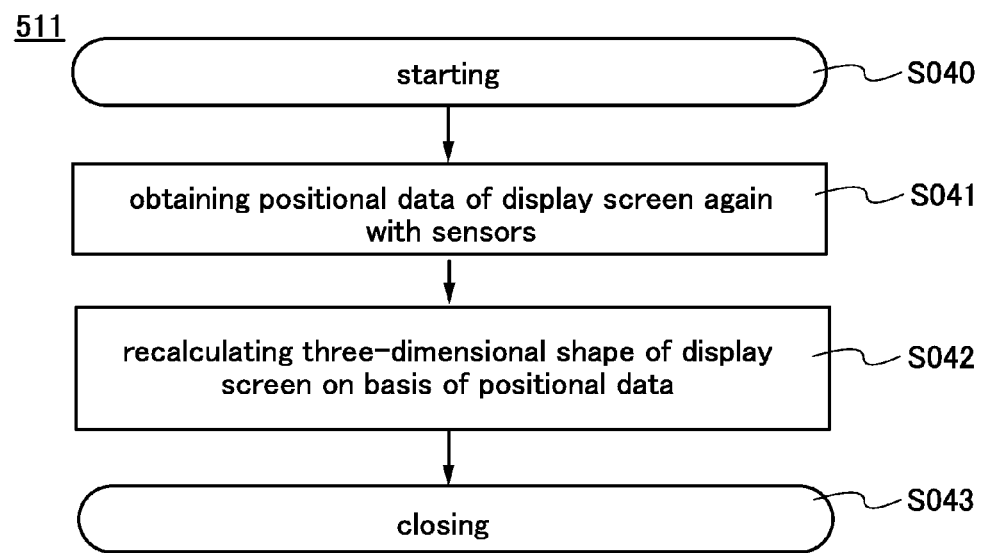
FIG. 9 is a flow chart illustrating steps of displaying an object.

Here, the recalculation sequence 511 for the three-dimensional shape of the display screen is described with reference to FIG. 9. When the recalculation sequence 511 for the three-dimensional shape of the display screen starts (S040), positional data of given parts of the display screen 102 is obtained again by the sensors 156 (S041). Then, the three-dimensional shape of the display screen 102 is recalculated on the basis of the positional data (S042). At the same time as the recalculation, data on the three-dimensional shape of the display screen 102 is stored in the storage portion 204, and after that, the recalculation sequence 511 for the three-dimensional shape of the display screen ends (S043).

By the recalculation sequence 511 for the three-dimensional shape of the display screen, the data on the previously calculated three-dimensional shape of the display screen 102 is updated by being overwritten with the newly obtained data on the three-dimensional shape of the display screen 102. Alternatively, without overwriting, an address different from that of the storage portion 204 in which the data on the previously calculated three-dimensional shape of the display screen 102 is stored may be specified to store the newly obtained data.

Further, at the same time as the recalculation sequence 511 for the three-dimensional shape of the display screen, data input with an input device such as a touch panel may be read from the input interface 167 in Step S023.

Then, for update of data on the motion of the object which is stored in the main memory 152, the motion of the object is simulated again (S024). The simulation of the motion of the object may be performed without exception; alternatively, it is possible to perform the simulation of the motion of the object only in the case where there is a difference between the data on the previously calculated three-dimensional shape of the display screen 102 and the data on the three-dimensional shape of the display screen 102 recalculated in Step S023 when these pieces of data are compared with each other. In this case, the amount of the change preferably has a predetermined threshold value for the comparison between the pieces of data on the three-dimensional shape, in which case noise or burdens due to unnecessary computation by the arithmetic portion 203 in a region unnoticeable to the user can be reduced. That is, it is preferable that it be determined that the three-dimensional shape of the display screen 102 has been changed only when the amount of the change of the data on the recalculated three-dimensional shape of the display screen 102 from the data on the previously calculated three-dimensional shape of the display screen 102 exceeds the predetermined threshold value, and the processing proceed to Step S024; when there is no change, the processing proceed to Step S025.

Next, in Step S025, whether the object is in motion or at rest is determined. In the object moving mode 510, simulation of the motion of the object is performed every period of $\Delta t$. Therefore, in some cases, the results of the simulation in Step S021 show that the object after $\Delta t$ is in motion. Further, depending on the results of the recalculation of the three-dimensional shape of the display screen 102 in Step S023, and the like, another motion of the object might occur by the simulation in Step S024. In this case, it is determined that the object is not at rest but in motion, so that the processing returns to Step S022.

In contrast, in the case where it is determined that the object is at rest, the object moving mode 510 is exited (S026).

As described above, a display is performed with the period of the motion of the object divided into periods each having a length of $\Delta t$, and the simulation is repeated with the shape of the display screen changed, whereby the motion of the object can be modified and displayed each time, which can have the user feel a sense of reality.

Figure 10:
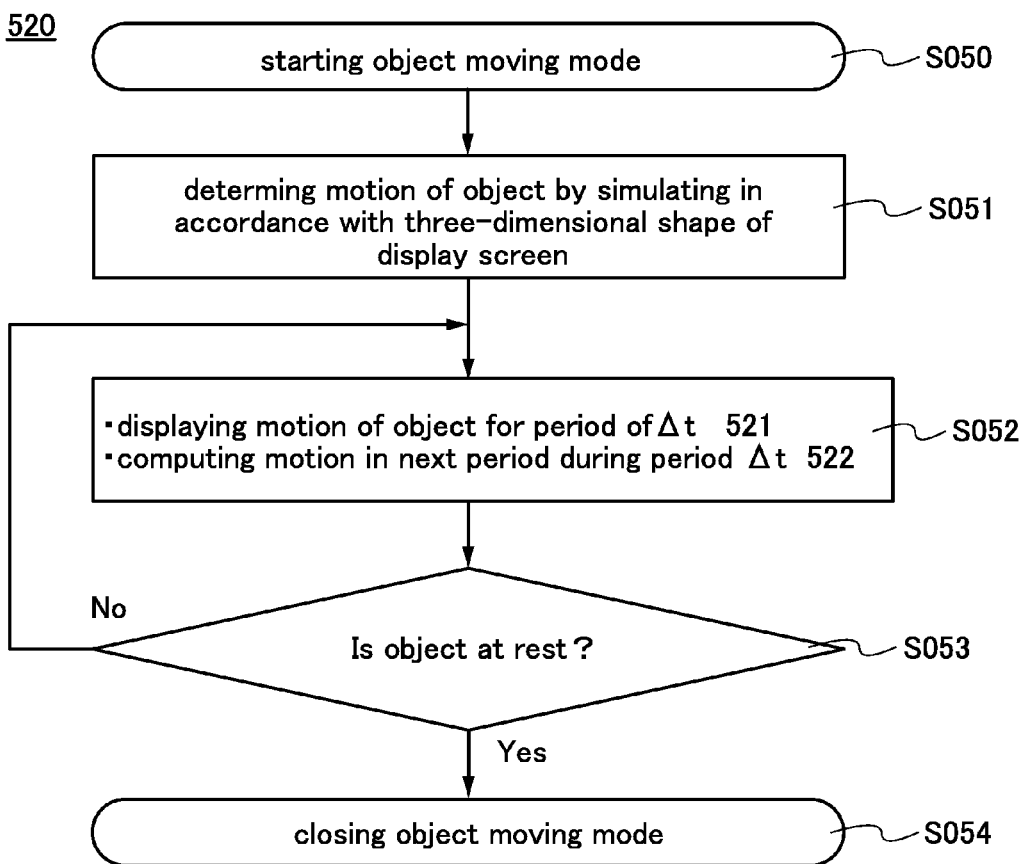
FIG. 10 is a flow chart illustrating steps of displaying an object.

FIG. 10 is a flow chart which shows a procedure for processing in the object moving mode 520 which is different from the procedure for processing described with reference to FIG. 8.

In the processing in the above-described object moving mode 510, time for displaying the motion of the object is divided and simulation for the next display is performed after an intended display is finished; meanwhile, in processing in the object moving mode 520, the motion of the object is displayed for a given period and in this period, simulation for the next display is performed.

When the object moving mode 520 starts (S050), the motion of the object is determined by simulation on the basis of data on the three-dimensional shape of the display screen 102 which has already been calculated (S051).

Then, the motion determined by the simulation is displayed for a given period (here, $\Delta t$), and during the period $\Delta t$, the motion of the object in the next period $\Delta t$ is simulated. The display of the motion of the object is executed in accordance with a display sequence 521 for the motion of the object, and the next motion of the object is executed in accordance with a computation sequence 522 for the motion of the object (S052).

Figure 11:
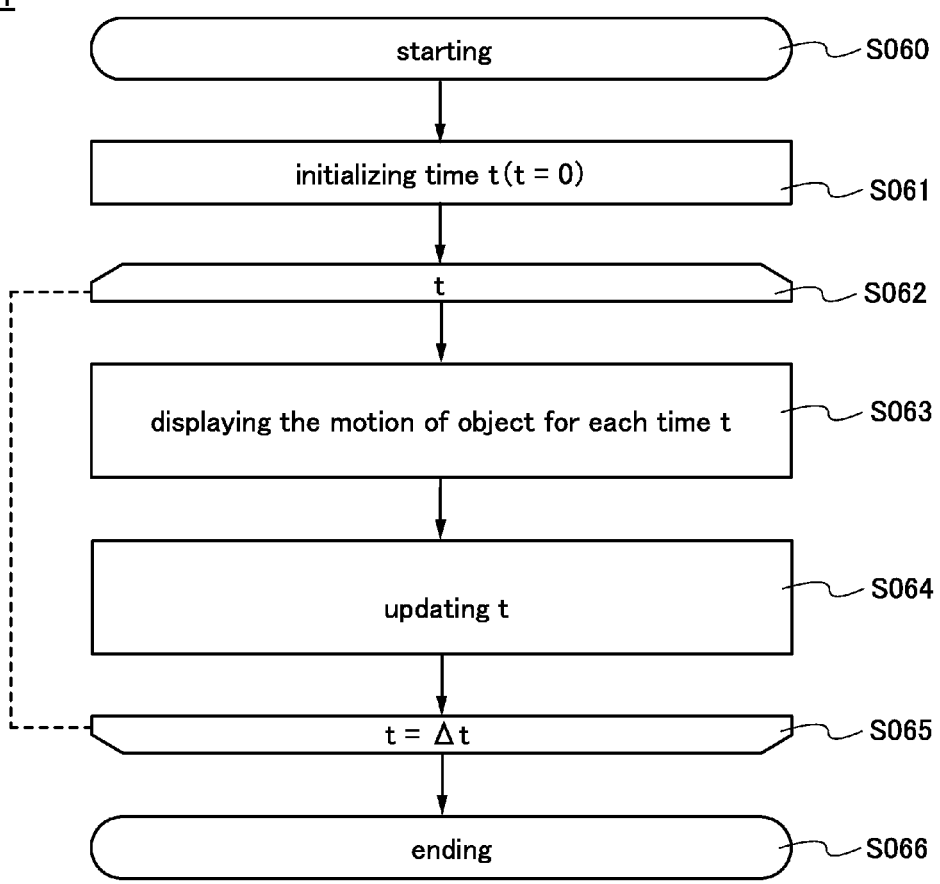
FIG. 11 is a flow chart illustrating steps of displaying an object.

Here, the display sequence 521 for the motion of the object is described with reference to FIG. 11. After the sequence starts (S060), the time t is initialized to "0" (S061). Then, in Steps S062 to S065, the motion of the object is displayed. That is, displaying the motion of the object for each time t (S063), updating t by addition of t (S064), and displaying the motion of the object again, are repeated until the time t becomes $\Delta t$ (S065). Accordingly, the motion of the object continues to be displayed until the time t becomes $\Delta t$. When the time t becomes $\Delta t$, the display sequence 521 for the motion of the object ends (S066).

Figure 12:
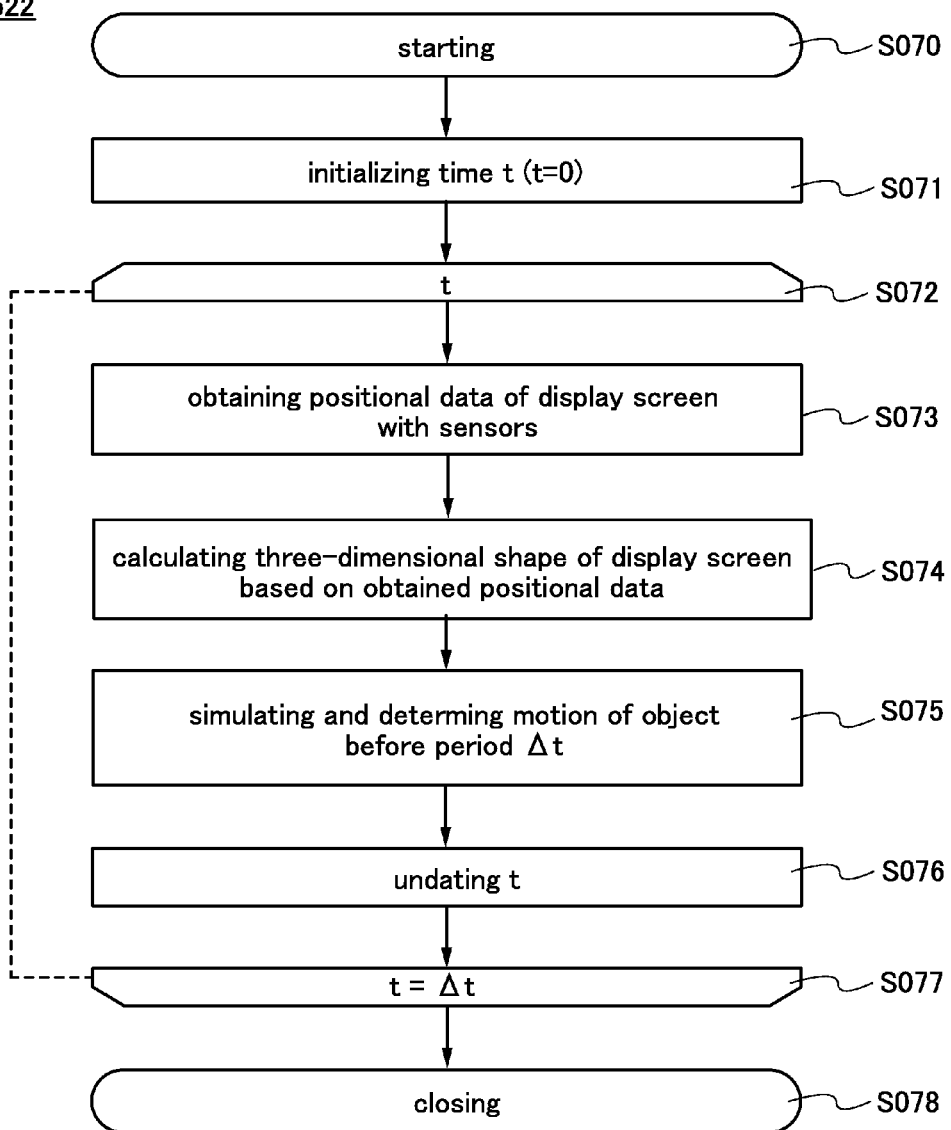
FIG. 12 is a flow chart illustrating steps of displaying an object.

Next, the computation sequence 522 for the motion of the object is described with reference to FIG. 12. In a manner similar to that of the display sequence 521 for the motion of the object, after the sequence starts (S070), the time t is initialized (S071). Then, in Steps S072 to S077, the motion of the object corresponding to the three-dimensional shape of the display screen 102 in the period $\Delta t$ is simulated.

With the sensors 156, positional data of given parts of the display screen 102 is obtained (S073). Then, the three-dimensional shape of the display screen 102 is calculated on the basis of the obtained positional data (S074). In accordance with data on the calculated three-dimensional shape of the display screen 102, the motion of the object for the period $\Delta t$ is simulated and determined (S075). After that, updating t by addition oft is performed (S076).

Steps S073 to S076 described above are repeated until t becomes $\Delta t$ (S077). Here, the period $\Delta t$ is the same as the period $\Delta t$ which is determined in the display sequence 521 for the motion of the object. By synchronization between the sequences, the sequences are concurrently performed during the same period ($\Delta t$). That is, in the display sequence 521 for the motion of the object, while the motion of the object is displayed, the motion of the object for the next period can be determined in advance by the computation sequence 522 for the motion of the object.

In the computation sequence 522 for the motion of the object, when the shape of the display screen 102 is changed during the period $\Delta t$, the determined motion of the object is modified by being overwritten. Note that in FIG. 12, the simulation of the motion of the object is repeated regardless of whether or not the shape of the display screen 102 is changed; however, a step of judging change in the shape of the display screen 102 may be inserted, in which case the simulation may be skipped when the shape is not changed. Further, the calculation of the three-dimensional shape of the display screen 102 may be performed only when the positional data obtained by the sensors shows a change greater than or equal to a predetermined value.

When t becomes $\Delta t$ as a result of the operation repeated as described above, the computation sequence 522 for the motion of the object ends (S078).

After Step S052, as illustrated in FIG. 10, whether the object is in motion or at rest is determined (S053). In the case where the object is in motion, the processing returns to Step S052, whereas in the case where the object is at rest, the object moving mode 520 is exited (S054), and the processing shifts into the object standby mode 530.

As described above, in the object moving mode 520 illustrated in FIG. 10, a display of the motion of the object and simulation of the motion of the object for the next period are performed in parallel during a given period. Such processing allows the user to feel a sense of reality.

Figure 13:
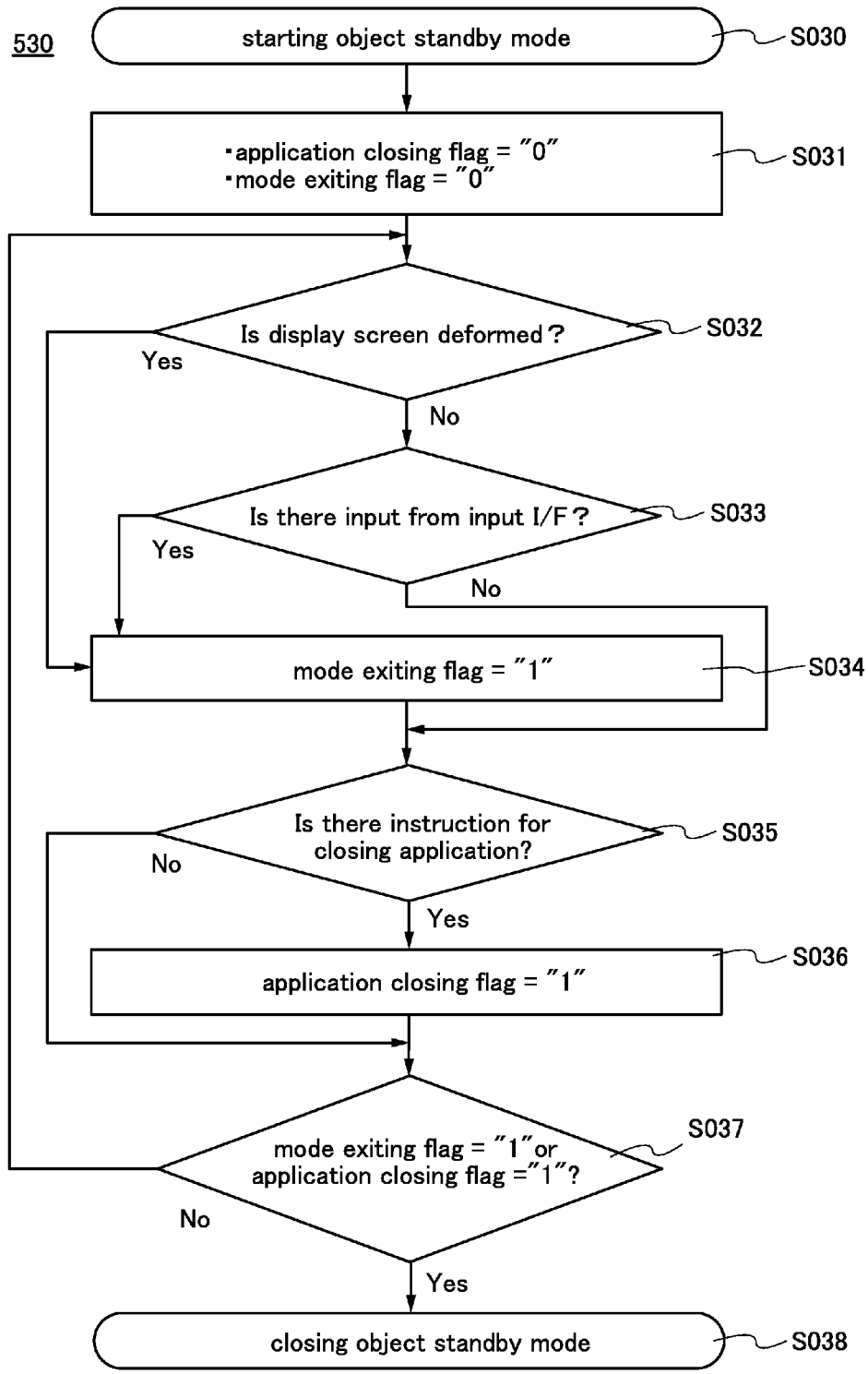
FIG. 13 is a flow chart illustrating steps of displaying an object.

Next, the object standby mode 530 is described. FIG. 13 is a flow chart which shows a procedure for processing in the object standby mode 530. The object standby mode refers to internal processing in the electronic device 100 which is performed in a period in which the object displayed on the display screen 102 is at rest, in a state where the application is running.

When the object standby mode starts (S030), in Step S031, the application closing flag which shows whether or not the application is closed and a mode exiting flag which shows whether or not the object standby mode 530 is exited are initialized. For example, both of the flags are set to "0".

Then, whether or not the display screen 102 is deformed is checked with the use of the sensors 156 (S032) by comparing the data on the three-dimensional shape of the display screen 102 which has already been calculated in Step S005, Step S042, or Step S074 with the data on the three-dimensional shape of the display screen 102 which is recalculated in Step S032 (S032). Note that the amount of the change preferably has a predetermined threshold value for the comparison between the pieces of data on the three-dimensional shape, in which case noise or burdens due to unnecessary computation by the arithmetic portion 203 in a region unnoticeable to the user can be reduced. That is, it is preferable that it be determined that the three-dimensional shape of the display screen 102 has been changed only when the amount of the change of the data on the recalculated three-dimensional shape of the display screen 102 from the data on the previously calculated three-dimensional shape of the display screen 102 exceeds the predetermined threshold value, and the processing proceed to Step S034.

In the case where it is determined that the three-dimensional shape of the display screen 102 has been changed, the mode exiting flag is set to "1" (S034). In the case where there is no change in the shape of the display screen 102, whether or not there is input from the input interface 167 is then checked. The input from the input interface 167 here is limited to input that affects the motion of the object. Similarly, when there is input, the mode exiting flag is set to "1" (S034). In the case where there is neither change in the shape of the display screen 102 nor the input from the input interface 167, the processing proceeds to the next step while the mode exiting flag remains "0".

In Step S035, whether or not there is notification of an instruction for closing the application is checked. When there is the notification, the application closing flag for the application is set to "1" (S036). The instruction for closing the application includes, for example, an instruction for closing the application from the user through the processor 151 and an instruction for closing the application from another application, a program, or an operating system. In the case where there is not the notification of the instruction for closing the application, the application closing flag remains "0", which is the initial value.

The flag is judged in Step S037. That is, in the case where one or both of the mode exiting flag and the application closing flag are set to "1", the object standby mode is exited (S038). In contrast, in the case where both of the flags are "0", the object standby mode persists. In other words, the processing returns to Step S032.

As described above, in the object standby mode 530, an input state is monitored by looping through checking of whether or not there is given input. When there is either kind of input, the object standby mode 530 is exited and the processing proceeds to Step S009.

This embodiment can be combined with any of the other embodiments as appropriate. Note that the present invention includes, in its scope, a method, hardware (e.g., an electronic device, a computer, a semiconductor device, or a storage medium), a system, a program, software, and the like in which the operations in the present invention are achieved.

(Embodiment 2)

Although the object 301 which is a spherical solid is described in Embodiment 1 as an example of an object, an object is not limited thereto. In this embodiment, the case where the object is designed to resemble liquid is described with reference to FIGS. 14A to 14C.

Figure 14A:
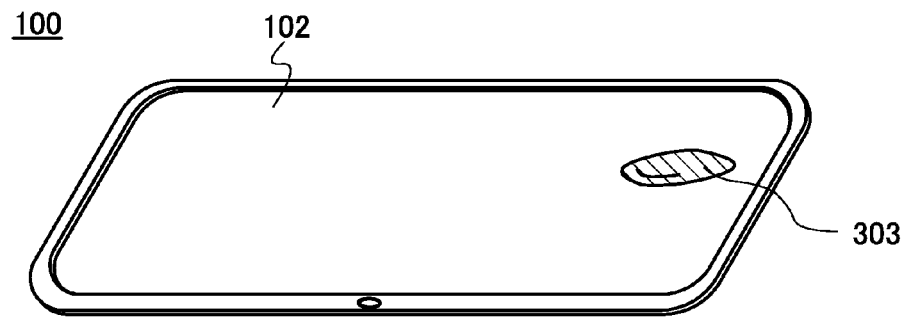
FIGS. 14A to 14C illustrate motion of an object displayed on a display screen.

FIG. 14A is a perspective view illustrating the electronic device 100 in which a liquid object 303 is displayed on the display screen 102. In a similar manner to the case of the electronic device 100 illustrated in FIGS. 6A to 6C, in order to describe display operation for the object 303, other displays are not shown in the drawing; however, any other display matters such as a background image, an icon, a toolbar, a pointer, a window, a text, a moving image, or a web browser can be actually displayed at the same time as the object 303.

The object 303 in FIG. 14A is designed to resemble a liquid body and is at rest at a given position. The range of motion of the object 303 is defined as a field, which functions as a ground that affects the motion of the object 303.

Figure 14B:
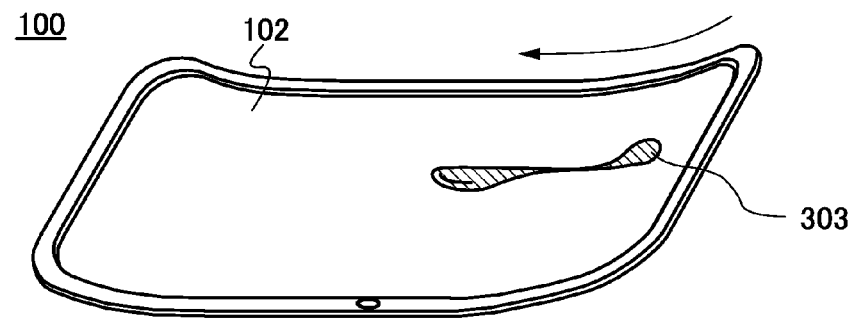

FIG. 14B illustrates the electronic device 100 whose right end portion is curved by being lifted. By the deformation of the electronic device 100, the display screen 102 is also deformed. The motion of the liquid object 303 is simulated by the arithmetic portion 203 so that the object moves according to the shape of the display screen 102. In FIG. 14B, since the right side of the display screen 102 is lifted, the liquid object 303 moves to the center of the display screen 102 as if it is attracted by gravity (in a direction represented by an arrow in the drawing).

The object 303 is defined as liquid by the object physical quantity 253 in the object data 250. The arithmetic portion 203 performs simulation by referring to data or a parameter stored in the object physical quantity 253 and indicating that the object is liquid. Simulation in which the object 303 moves like real liquid according to a law of fluid mechanics (hydraulics) is performed, whereby the motion of the object is displayed as if liquid flows from higher to lower areas. As the data or parameter indicating that the object is liquid, for example, a value of density, viscosity, a compaction property, surface tension, or the like may be prepared as a physical quantity, or for simplicity, the degree of a physical quantity such as viscosity may be divided into several levels to be prepared as several pieces of data. Further, an image set of liquid in various forms is preferably stored in the object image 254 in advance so as to provide the user with visual recognition of the liquid flowing.

A physical quantity and the like are set also for the field; for example, the liquid object moves while encountering friction determined for the field.

Applying various laws to the motion of the liquid object 303 as described above allows the user to feel a sense of reality.

Note that all of the physical quantities and the like of the object 303 and the field are not necessarily referred to, and only part of them may be used for reference. When only part is referred to, burdens on the arithmetic portion 203 can be reduced. Similarly, only part of the group of equations which are stored in the storage portion 204 may be used in the simulation. Although only one object 303 is displayed on the field in FIG. 14B, the plurality of objects 303 may be displayed. For example, in the case where more complicated computation is possible, by being made to move, the liquid object 303 can be divided into a plurality of objects or the plurality of objects can be combined into one object. In this case, each of the objects may be provided with the object ID 251 in response to generation and disappearance of the objects so as to be defined, or the state of one object having one object ID which is divided into a plurality of objects may be stored as data of the object shape 252 or the like. Further, for simplification of the computation, an image expressing splash may be displayed around the liquid object 303 appropriately.

Figure 14C:
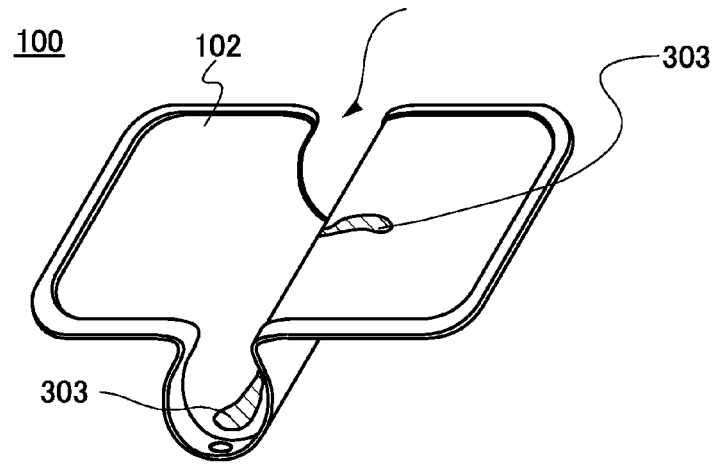

FIG. 14C illustrates motion of the liquid object 303 in the case where the electronic device 100 is deformed by being further curved to protrude downward. For example, the liquid object 303 which has been positioned as illustrated in FIG. 14B flows into the hollow formed by the curving of the display screen 102. The object 303 which has flowed into the hollow is enclosed on both sides by high walls of the display screen 102 and thus cannot move from side to side; the object 303 collects at the bottom of the hollow and stops after a while.

In the above manner, data on the three-dimensional shape of the display screen 102 is calculated using the sensors 156 and the processor 151, whereby the liquid object 303 which moves according to the shape can be displayed. Accordingly, the user can feel a sense of reality as if the liquid object 303 displayed on the display screen 102 exists on the surface of the electronic device 100.

This embodiment can be combined with any of the other embodiments as appropriate. Note that the present invention includes, in its scope, a method, hardware (e.g., an electronic device, a computer, a semiconductor device, or a storage medium), a system, a program, software, and the like in which the operations in the present invention are achieved.

(Embodiment 3)

In this embodiment, an electronic device in which a touch panel is used as an input device included in an input portion and the object can be controlled by input from the touch panel is described with reference to FIGS. 15A and 15B.

Figure 15A:
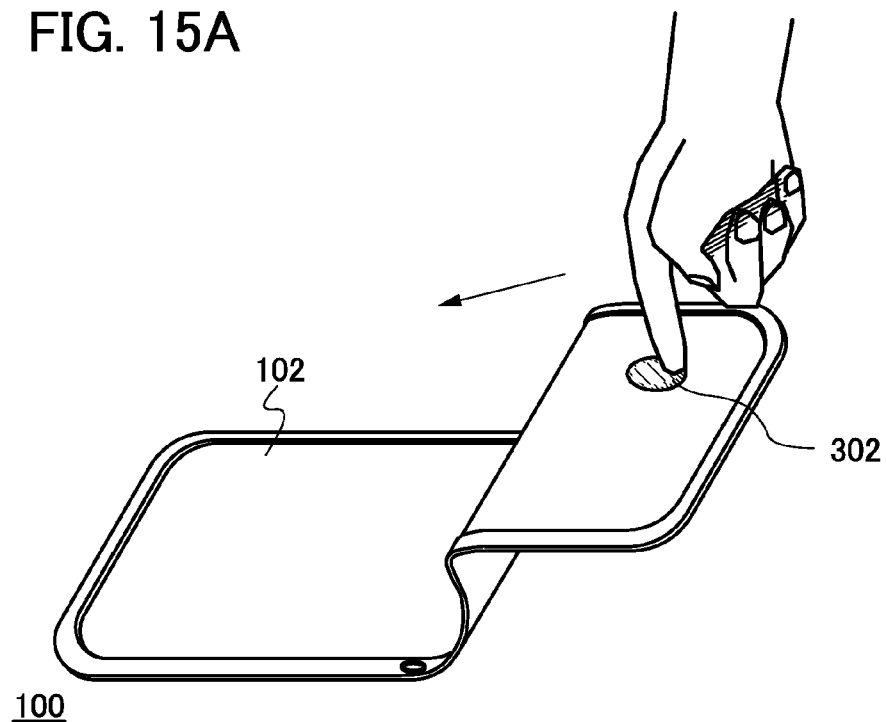
FIGS. 15A and 15B illustrate motion of an object displayed on a display screen.
Figure 15B:
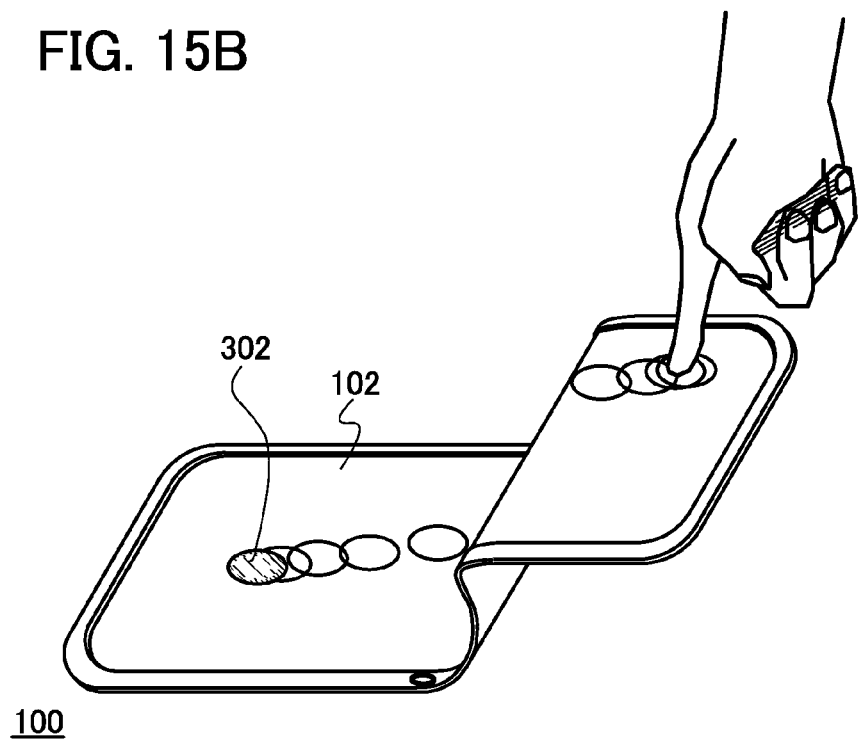

FIG. 15A is a perspective view illustrating the electronic device 100 which is curved. An object 302 which is a spherical solid is displayed on the right end portion on the display screen 102 of the electronic device 100. When a user touches the object 302 (actually the user touches the touch panel on the display screen 102 where the object 302 is displayed) and flick the display screen 102 to the left (in a direction denoted by an arrow in FIG. 15A) with his/her finger, for example, the object 302 rolls in the direction of the flick, in response to the motion of the finger. In FIG. 15B, the display screen 102 is curved at the center to have a steep step from right to left; thus, the object 302 is displayed as if the object 302 falls down and rolls due to this curve.

With such a structure in which the electronic device 100 includes the touch panel in the input portion, the procedure for display processing of the object is the same as that described in Embodiment 1 in principle. However, the conditions for starting the motion of the object are access to the object through the touch panel as well as detection of deformation of the display screen 102, which is described in Embodiment 1. Therefore, in the procedure for processing described in Embodiment 1, the steps for determining move of an object (S006, S025, and S053) involve checking of whether or not there is detection of input with the touch panel.

In a similar manner, in the object moving mode 510 illustrated in FIG. 8, data on input from the touch panel is updated in the step for updating concerning change in the three-dimensional shape of the display screen (S023). Further, in the object moving mode 520 illustrated in FIG. 10, data on input from the touch panel is checked in the step for obtaining positional data with the sensors (S073) and the step for calculating the three-dimensional shape of the display screen (S074). Further, in the object standby mode 530 illustrated in FIG. 13, data on input from the touch panel is checked in the step for checking whether or not there is input from the input interface 167 (S033).

Figure 16A:
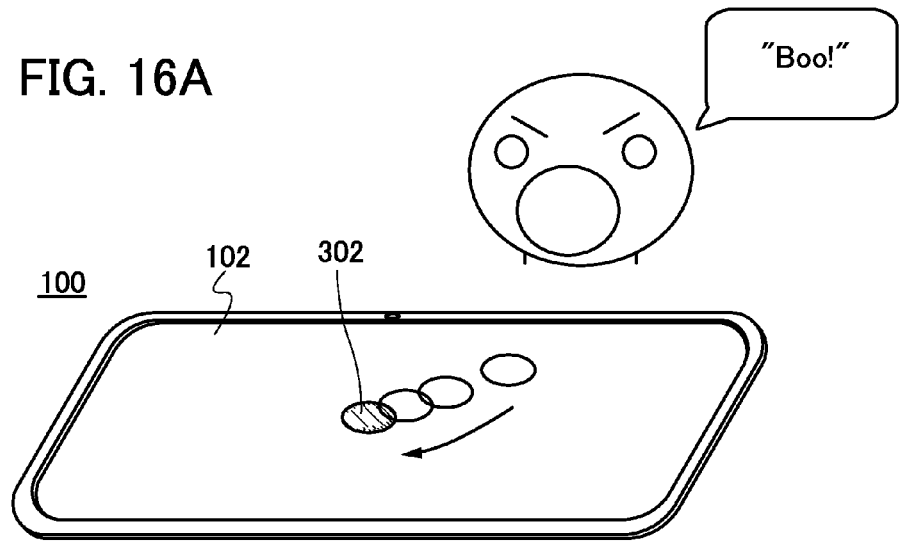
FIGS. 16A and 16B each illustrate motion of an object displayed on a display screen.
Figure 16B:
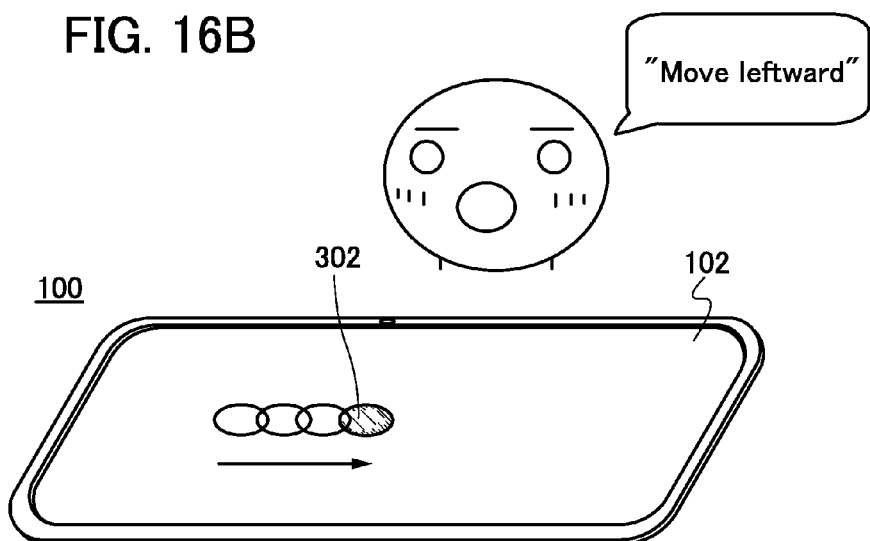

Note that although the example in which the touch panel is used for moving the object 302 is described in this embodiment, the object 302 may be made to move using, other than the touch panel, any of a variety of input devices which can be included in the input portion 205; for example, a housing switch provided on the housing 101, a keyboard which is incorporated in or externally provided to the electronic device 100, a pointing device (e.g., a mouse or a controller) which is connected to the external port, a microphone for sound input, and the like can be used. When a microphone is used, for example, the motion of the object 302 can be appropriately adjusted to be displayed depending on the volume of input sound (see FIG. 16A). It is also possible to analyze input of the user's voice "move leftward", recognize the meaning, and make the object move leftward in accordance with the content, for example (see FIG. 16B). Further, a gesture device which detects gesture (motion) of a user and converts it into an input signal may be provided in the input portion 205 of the electronic device 100 to move the object 302.

As described above, the input portion 205 can include a variety of input devices with which the object 302 displayed on the display screen 102 can be made to move, so that the user can feel a sense of reality as if the object exists on the surface of the electronic device 100.

This embodiment can be combined with any of the other embodiments as appropriate. Note that the present invention includes, in its scope, a method, hardware (e.g., an electronic device, a computer, a semiconductor device, or a storage medium), a system, a program, software, and the like in which the operations in the present invention are achieved.

(Embodiment 4)

In this embodiment, the case where processing for displaying an object on the display screen is executed at the same time as a different application is described with reference to FIGS. 17A and 17B.

Figure 17A:
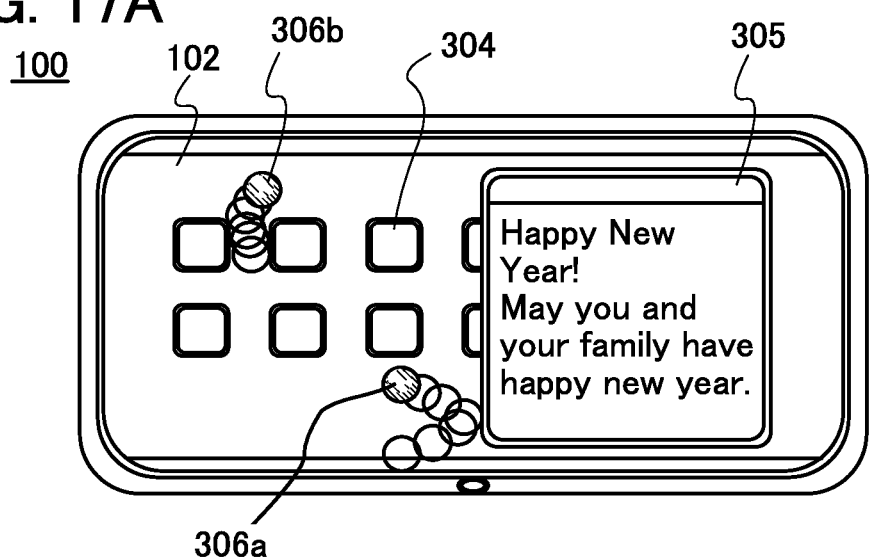
FIGS. 17A and 17B each illustrate motion of an object displayed on a display screen.

In FIG. 17A, different application software is running and an electronic document is displayed in a window 305 of the application software on the display screen 102. Further, on the display screen 102, a plurality of icons 304 of the home screen which is displayed by the operating system of the electronic device 100 are displayed.

Although text-editing application software is illustrated as the different application software in FIG. 17A, the present invention is not limited thereto; various kinds of application software for spreadsheets, database administration, phone calls, e-mailing, web browsers, blogs, videoconference, music reproduction, moving image reproduction, digital cameras, digital video cameras, e-book readers, computer games, and the like are included.

An object 306a and an object 306b according to one embodiment of the present invention are displayed on the display screen 102. The object 306a and the object 306b move in response to input from the sensors or the input portion described in Embodiments 1 to 3. Here, the object 306a and the object 306b are set so that the objects are not allowed to move in the entire region of the display screen 102 and cannot enter given regions. That is, in FIG. 17A, the regions in which the plurality of icons 304 and the window 305 of the application software are displayed are set as the regions where the objects cannot enter, so that the object 306a and the object 306b move while avoiding the regions. In addition, when these regions where the objects cannot enter are regarded as bodies with given physical quantities, the motion of the objects is set to be defined depending on the physical quantities.

Figure 17B:
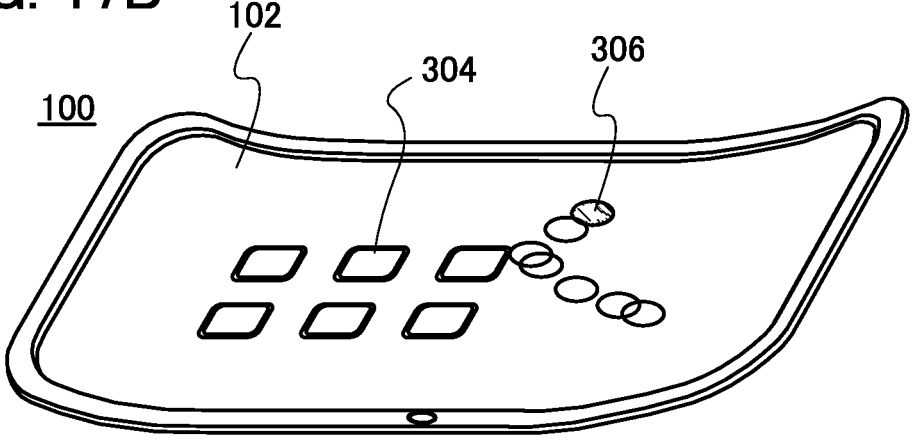

Further, as illustrated in FIG. 17B, motion of an object 306, which moves in accordance with deformation of the display screen 102, is also affected by the icons 304. Thus, the actual shape of the display screen 102 and the shapes of the virtual icons 304 similarly influence the motion of the object 306, so that the user can further feel a sense of reality.

In this manner, when not only an object and a field but also a variety of images displayed on the display screen 102, such as icons or windows of application software have physical quantities to be treated as bodies, the motion of the object can be more realistic.

Note that a target which is provided with a physical quantity and treated as a body is not limited to an image displayed on the display screen and may be ends (four sides) of the display screen, a finger of a user which is detected with the touch panel, or the like.

In order to achieve such a display, images such as icons or windows can be regarded as second objects and object IDs, object shapes, object physical quantities, or the like can be set in advance. The conditions of the second objects may be incorporated in simulation of the motion of the object by the arithmetic portion.

Alternatively, images such as icons or windows may be defined as parts of a field and integrated into field data to be reflected in the simulation of the motion of the object.

Note that not all the images such as the icons or windows are necessarily regarded as bodies; only predetermined icons or windows may be regarded as bodies. Alternatively, the object may be displayed moving on these images so that the images are regarded as a background for the object without being regarded as bodies. It is also possible to allow the user to decide whether to regard these images as bodies.

In the case of performing such processing of the motion of the object which incorporates images such as icons or windows of application software or ends of the display screen as bodies, a display of these images and the like is controlled by the operating system; thus, the processing needs to interlock with the operating system. Therefore, by incorporating the procedure for display processing of the object into the operating system as a module, a series of steps of display processing of the object can be executed efficiently.

This embodiment can be combined with any of the other embodiments as appropriate. Note that the present invention includes, in its scope, a method, hardware (e.g., an electronic device, a computer, a semiconductor device, or a storage medium), a system, a program, software, and the like in which the operations in the present invention are achieved.

(Embodiment 5)

In this embodiment, display processing in which a given region of a curved display screen is selected and an object moves only in the region is described with reference to FIGS. 18A and 18B.

Figure 18A:
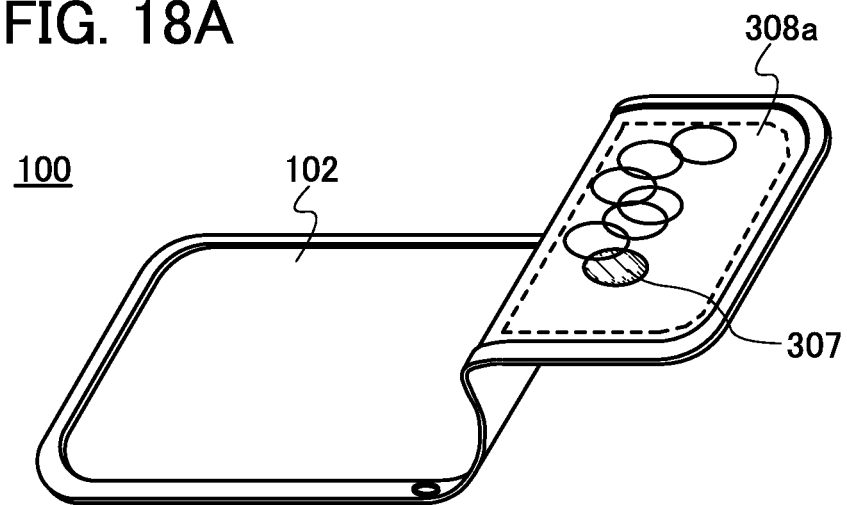
FIGS. 18A and 18B each illustrate motion of an object displayed on a display screen.
Figure 18B:
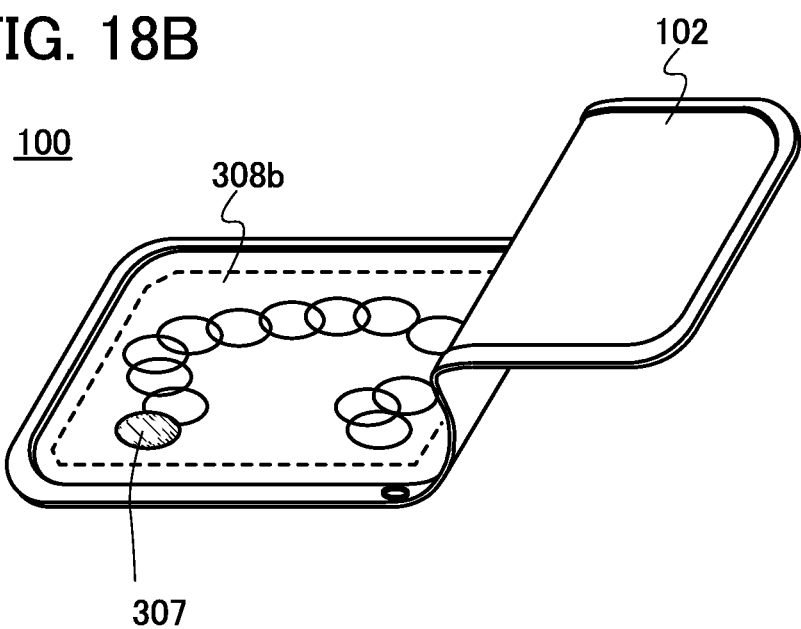

FIGS. 18A and 18B are perspective views of the electronic device 100 in which an object 307 is displayed on part of the curved display screen 102. The display screen 102 is curved at the center to have a steep step from right to left.

In FIG. 18A, the object 307 is displayed on a high right part (a region 308a) of the curved display screen 102. The object 307 recognizes the high part of the curved display screen 102, i.e., the region 308a and moves selectively in the region 308a.

In FIG. 18B, the object 307 is displayed on a low left part (a region 308b) of the curved display screen 102. The object 307 recognizes the low part of the curved display screen 102, i.e., the region 308b and moves selectively in the region 308b.

Such a display of an object can be used for a home screen or a screensaver of the operating system or various kinds of application software.

To perform the above display of an object, the procedure for processing which is described in Embodiment 1 can be used. However, in the object moving mode of the procedure for processing, a region in which an object can move needs to be defined in accordance with the three-dimensional shape of the display screen 102 as appropriate. Thus, in the object moving mode, the procedure for processing which is illustrated in FIG. 19 is employed, for example.

FIG. 19 is a flow chart which illustrates a procedure for processing in an object moving mode 540 in this embodiment, which is obtained by adding some steps to the object moving mode 510. After the object moving mode starts (S080), a region in which the object can move is determined in Step S081 on the basis of data on the three-dimensional shape of the display screen 102 which has already been calculated by the arithmetic portion 203.

In this embodiment, the region in which the object can move is defined as a given height of the display screen 102. For example, when the middle position of the display screen is set as a position of reference, a two-dimensional space positioned above (or below) the position of reference by a given height can be defined as the region in which the object can move. Alternatively, a three-dimensional space positioned above (or below) the position of reference by a given range of heights can be defined as the region in which the object can move. Such a two-dimensional or three-dimensional space may be defined as a value in advance, or a given space including a portion in which an object is displayed may be defined as a region in which the object can move.

After the region in which the object can move is determined, motion of the object in the region is determined in Step S082. In simulation of the motion of the object at this time, data on the region which is determined in Step S081 is used as boundary conditions. Subsequent steps of processing for a display and the like (S083 to S089) are similar to those in the object moving mode 510 which is illustrated in FIG. 8. Note that in the case where the shape of the display screen 102 is changed during motion of the object, a region in which the object can move is determined again in Step S086, and a display of the motion of the object is overwritten.

This embodiment can be combined with any of the other embodiments as appropriate. Note that the present invention includes, in its scope, a method, hardware (e.g., an electronic device, a computer, a semiconductor device, or a storage medium), a system, a program, software, and the like in which the operations in the present invention are achieved.

(Embodiment 6)

In this embodiment, a computer game which utilizes a display of an object moving in accordance with the shape of the display screen is described with reference to FIGS. 20A and 20B.

Figure 20A:
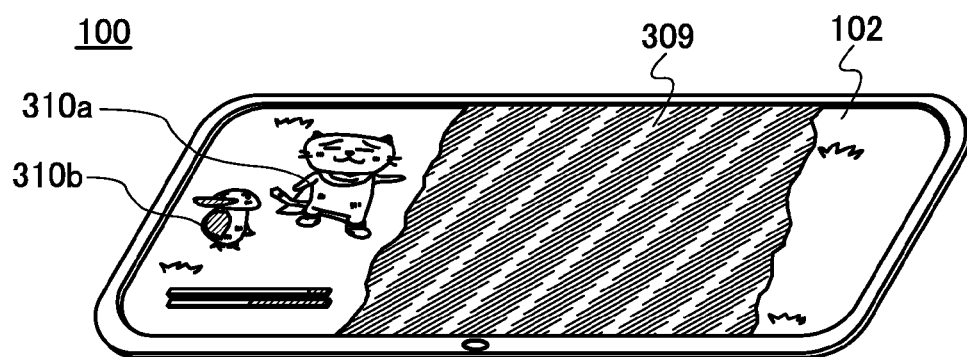
FIGS. 20A and 20B illustrate motion of objects displayed on a display screen.
Figure 20B:
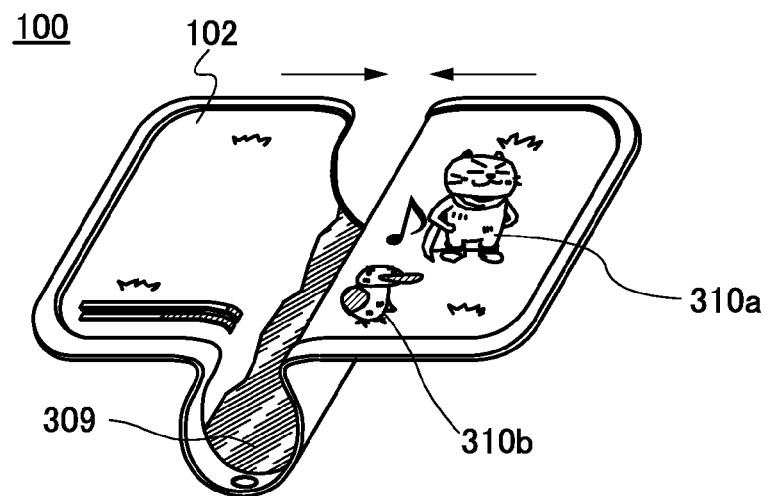

FIGS. 20A and 20B are perspective views illustrating the electronic device 100 in which images of a computer game are displayed on the display screen 102. In FIG. 20A, the display screen 102 is planar. A river 309 runs through the center of the display screen 102, and a character 310*a* and a character 310*b* which are controllable by the user are displayed on the left bank of the river 309. In this computer game, the river 309 running through the center prevents the character 310*a* and the character 310*b* from moving to the right bank.

Under the circumstances, as illustrated in FIG. 20B, the user curves the display screen 102 such that the center of the display screen 102 protrudes downward (the user moves the display screen 102 in the directions denoted by arrows in FIG. 20B), whereby the river 309 moves to the part bended downward and both of the banks are brought close to each other; thus, the character 310*a* and the character 310*b* can be made to move to the right bank.

Here, by setting the river 309 as the above-described object, water flow in the river 309 interlocks with deformation of the display screen 102, whereby the user can feel a sense of reality. In addition, by calculation of the shape of the display screen 102 using the sensors 156, the range of motion of the characters can be controlled in accordance with the shape.

To achieve such a computer game, the procedures for display processing of objects which are described in any of Embodiments 1 to 5 can be applied to bodies including characters in the computer game. The procedure for display processing of an object may be incorporated in a computer program as a module, or may be executed while interlocking with an operating system in which the procedure for display processing of an object is incorporated. Such a program, a module, or the like may be stored in a computer-readable storage medium such as the auxiliary memory 154 or the main memory 152, or alternatively such a processing means may be achieved in the form of an electronic circuit or mechanical hardware.

As described above, the game can proceed depending on change in the shape of the display screen 102, so that the user can enjoy reality of the computer game.

This embodiment can be combined with any of the other embodiments as appropriate. Note that the present invention includes, in its scope, a method, hardware (e.g., an electronic device, a computer, a semiconductor device, or a storage medium), a system, a program, software, and the like in which the operations in the present invention are achieved.

REFERENCE NUMERALS

100: electronic device, 101: housing, 102: display screen, 103: home button, 104: volume control button, 105: mute button, 106: microphone, 107: speaker, 108: sleep button, 109: camera, 150: system bus, 151: processor, 152: main memory, 153: memory controller, 154: auxiliary memory, 155: sensor controller, 156: sensor, 157: display controller, 158: display device, 159: power supply controller, 160: power supply, 161: communication controller, 162: communication I/F, 163: sound controller, 164: speaker, 165: sound output connector, 166: microphone, 167: input interface, 168: housing switch, 169: touch panel, 170: keyboard, 171: camera, 172: external port, 173: output interface, 174: vibration motor, 180: RAM, 181: ROM, 182: operating system, 183: application program, 184: program module, 185: program data, 186: BIOS, 187: display portion physical property data, 188: sensor characteristics data, 201: display portion, 202: detection portion, 203: arithmetic portion, 204: storage portion, 205: input portion, 206: output portion, 250: object data, 251: object ID, 252: object shape, 253: object physical quantity, 254: object image, 255: default of an object, 260: field data, 261: field ID, 262: field shape, 263: field physical quantity, 264: field image, 265: default of a field, 301: object, 302: object, 303: object, 304: icon, 305: window, 306: object, 306*a*: object, 306*b*: object, 307: object, 308*a*: region, 308*b*: region, 309: river, 310*a*: character, and 310*b*: character.

This application is based on Japanese Patent Application Ser. no. 2012-109132 filed with Japan Patent Office on May 11, 2012, the entire contents of which are hereby incorporated by reference.

The invention claimed is:

1. A displaying method comprising the steps of:
    determining a three-dimensional shape of a display in a deformed state of an electronic device, the display having flexibility; and
    displaying an object on the display,
    wherein the object is displayed to move in accordance with the three-dimensional shape of the display in the deformed state as if the object displayed on the display is attracted by gravity, and
    wherein a shape of the object is changed in accordance with the three-dimensional shape of the display in the deformed state as if the object displayed on the display is attracted by gravity.

2. The displaying method according to claim 1, further comprising the step of storing data of the three-dimensional shape of the display.

3. The displaying method according to claim 1, wherein the shape of the object is determined in accordance with data on physical quantity stored in a storage portion.

4. A displaying method comprising the steps of:
    sensing positional data of a display screen of an electronic device, the display screen having flexibility;
    determining a three-dimensional shape of the display screen on the basis of the positional data;
    simulating motion of an object displayed on the display screen; and
    determining the motion of the object,
    wherein the object is displayed to move in accordance with change in the three-dimensional shape of the display screen as if the object displayed on the display screen is attracted by gravity, and
    wherein a shape of the object is changed in accordance with change in the three-dimensional shape of the display screen as if the object displayed on the display screen is attracted by gravity.

5. The displaying method according to claim 4, further comprising the step of storing data of the three-dimensional shape of the display screen.

6. The displaying method according to claim 4, wherein the display screen comprises a touch panel thereover.

7. The displaying method according to claim 6, wherein the touch panel is a resistive type or a capacitive type.

8. The displaying method according to claim 4, wherein the shape of the object is determined in accordance with data on physical quantity stored in a storage portion.

9. An electronic device comprising:
a display portion configured to display an object on a display screen, the display screen having flexibility; and
an arithmetic portion configured to determine a three-dimensional shape of the display screen,
wherein the object is displayed to move in accordance with change in the three-dimensional shape of the display screen as if the object displayed on the display screen is attracted by gravity, and
wherein a shape of the object is changed in accordance with change in the three-dimensional shape of the display screen as if the object displayed on the display screen is attracted by gravity.

10. The electronic device according to claim 9, further comprising a detection portion configured to sense positional data of the display screen, the positional data being output to the arithmetic portion.

11. The electronic device according to claim 9, further comprising a storage portion configured to store data of the three-dimensional shape of the display screen.

12. The electronic device according to claim 9, further comprising an input portion comprising a touch panel.

13. The electronic device according to claim 12, wherein the touch panel is a resistive type or a capacitive type.

14. The electronic device according to claim 9, wherein the electronic device is an electronic game machine.

15. The electronic device according to claim 9, wherein the shape of the object is determined in accordance with data on physical quantity stored in a storage portion.

* * * * *